(12) United States Patent
Nguyen et al.

(10) Patent No.: US 10,146,004 B2
(45) Date of Patent: Dec. 4, 2018

(54) SEGMENTED BACKLIGHT FOR DYNAMIC CONTRAST

(71) Applicant: zSpace, Inc., Sunnyvale, CA (US)

(72) Inventors: Thanh-Son Nguyen, Santa Clara, CA (US); Hsienhui Cheng, Sunnyvale, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 15/872,188

(22) Filed: Jan. 16, 2018

(65) Prior Publication Data

US 2018/0203179 A1 Jul. 19, 2018

Related U.S. Application Data

(60) Provisional application No. 62/447,291, filed on Jan. 17, 2017.

(51) Int. Cl.
*F21V 7/04* (2006.01)
*F21V 8/00* (2006.01)
*H04N 13/302* (2018.01)
*G02B 6/00* (2006.01)

(52) U.S. Cl.
CPC .............. *G02B 6/0068* (2013.01); *G02B 6/00* (2013.01); *G02B 6/0073* (2013.01); *G02B 6/0078* (2013.01); *H04N 13/302* (2018.05)

(58) Field of Classification Search
None
See application file for complete search history.

(56) References Cited

U.S. PATENT DOCUMENTS

| | | | |
|---|---|---|---|
| 7,641,374 B2 * | 1/2010 | Chen ..................... | G02B 6/0036 362/606 |
| 8,755,006 B2 * | 6/2014 | Yu .......................... | G02B 6/009 312/223.5 |
| 9,019,443 B2 * | 4/2015 | Park ..................... | G02B 6/0068 349/65 |

* cited by examiner

*Primary Examiner* — Vip Patel
(74) *Attorney, Agent, or Firm* — Meyertons Hood Kivlin Kowert & Goetzel, P.C.; Jeffrey C. Hood; Brian E. Moore

(57) ABSTRACT

Systems and methods for increasing dynamic contrast in a liquid crystal display (LCD) may include a segmented backlight that may include one or more segments and one or more sets of light emitting diodes (LEDs). Each set of LEDs may be configured to illuminate a corresponding segment and each segment may include a notch(es) configured as a light barrier to reduce light leakage to non-adjacent segments. The notch(es) may be of variable length, depth, and width and may be three-dimensional, having a width the varies along the depth and length of the notch and a depth that varies along the width and length of the notch. In some embodiments, the notch(es) may be reflective, some degree of opaque, and/or blackened.

20 Claims, 18 Drawing Sheets

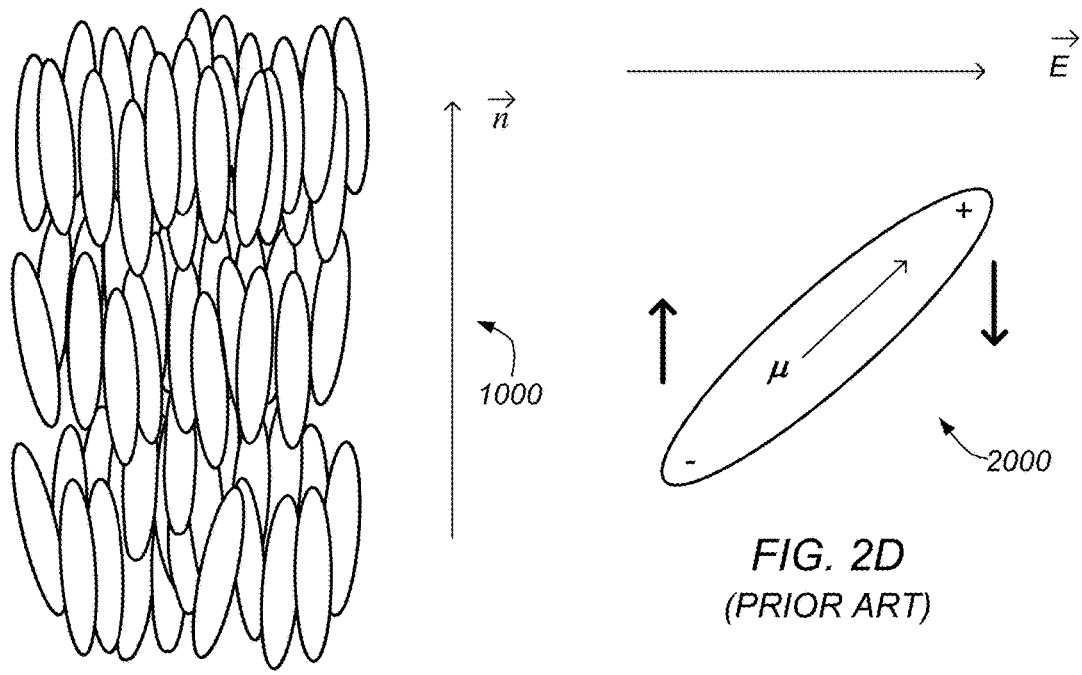
FIG. 2C
(PRIOR ART)
FIG. 2D
(PRIOR ART)
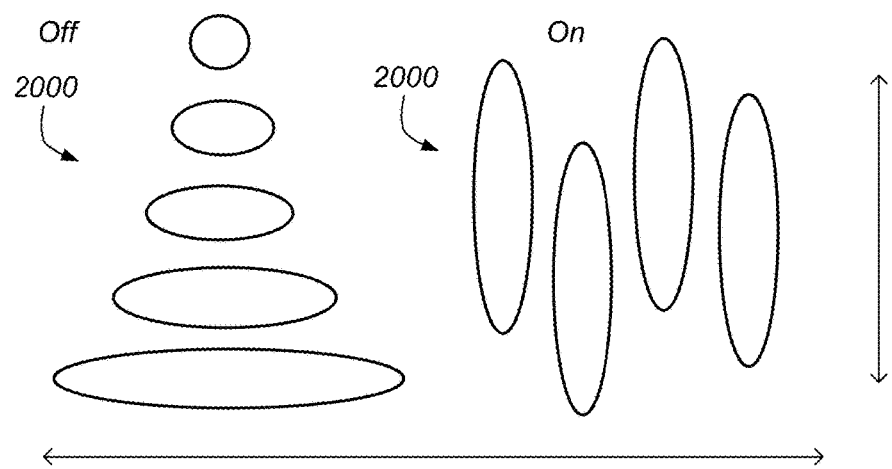
FIG. 2E
(PRIOR ART)

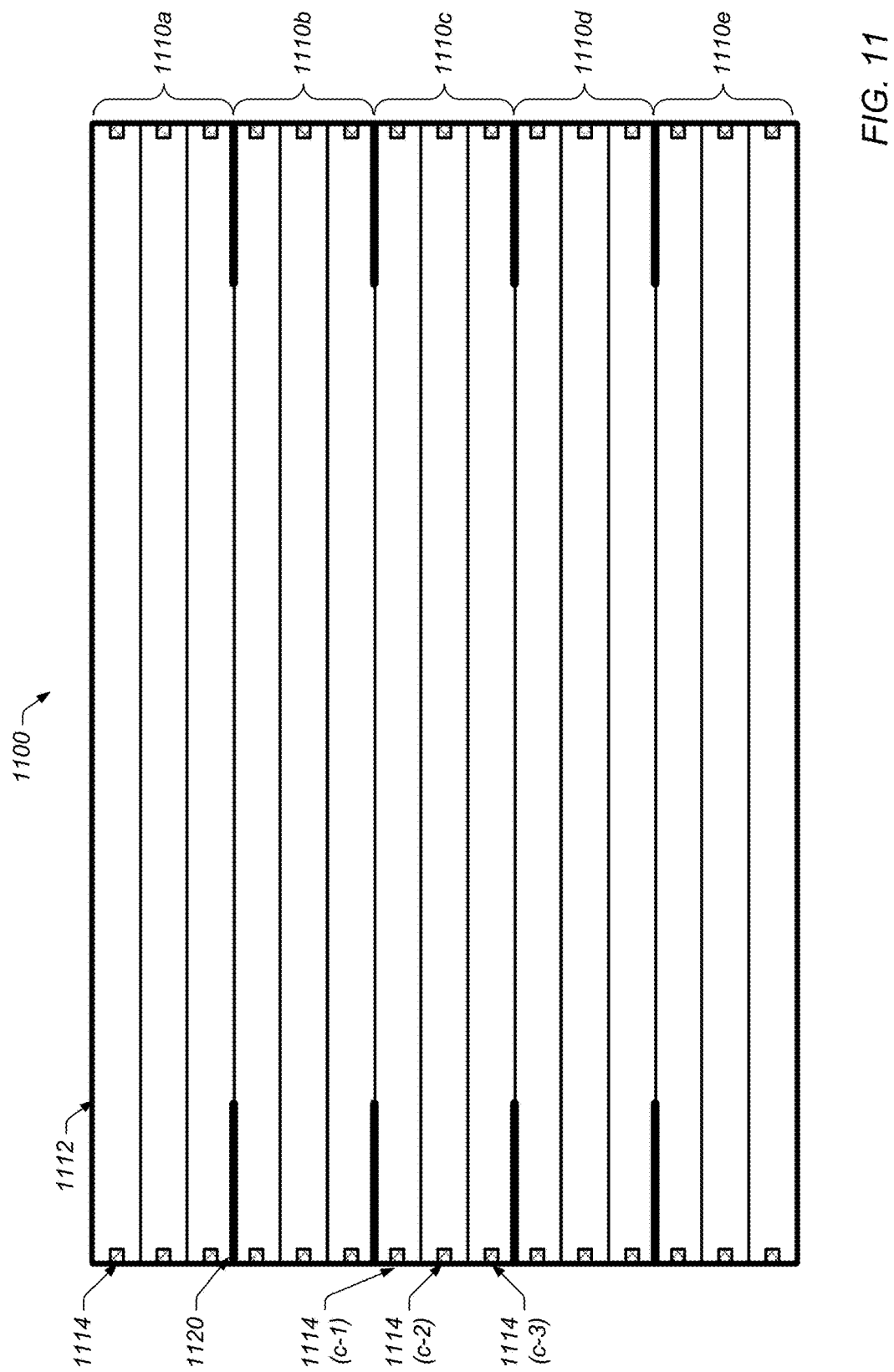

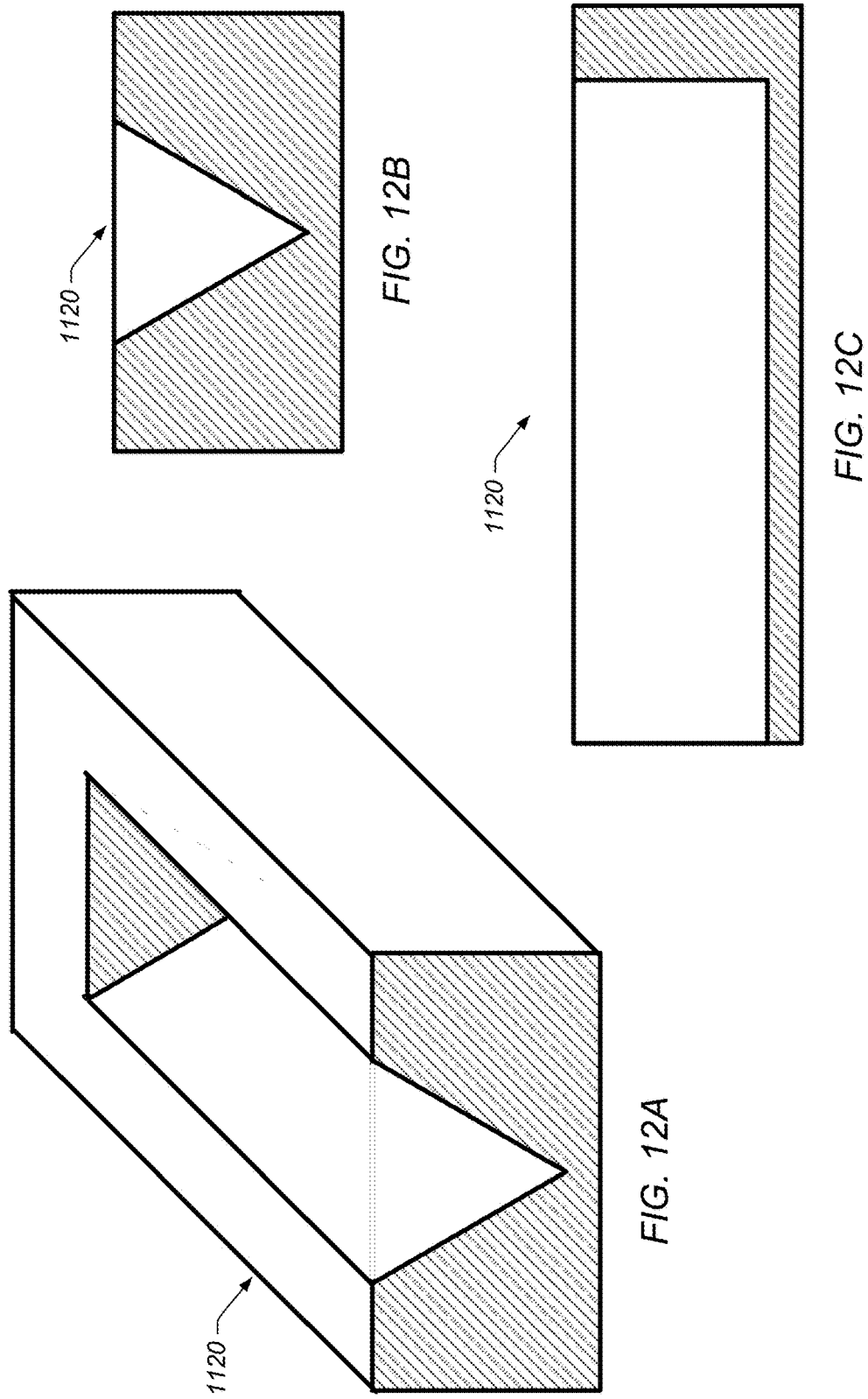

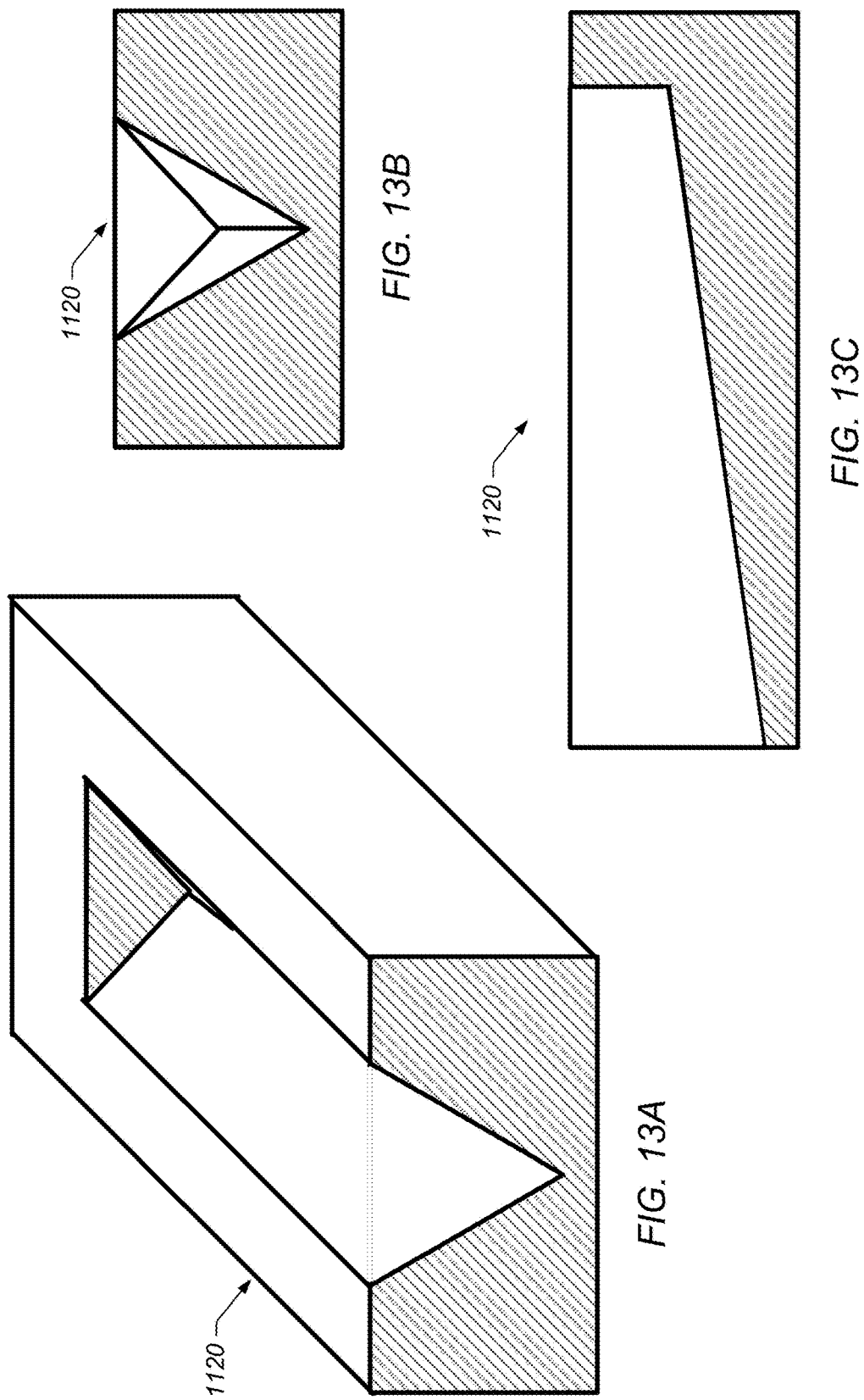

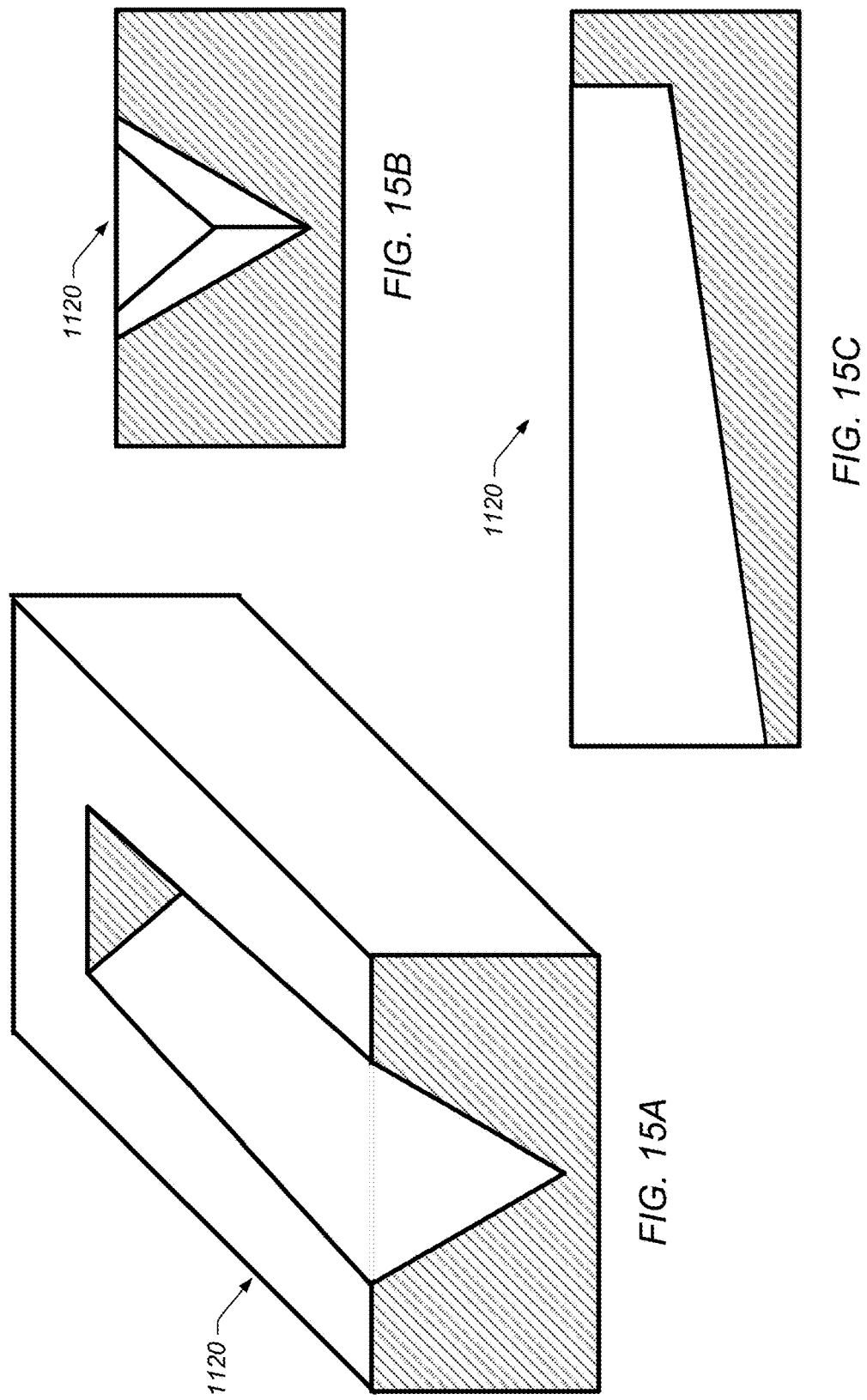

SEGMENTED BACKLIGHT FOR DYNAMIC CONTRAST

PRIORITY DATA

This application claims benefit of priority to U.S. Provisional Application Ser. No. 62/447,291, titled "Segmented Backlight for Dynamic Contrast", filed Jan. 17, 2017, by Thanh-Son Nguyen and Hsienhui Cheng, which is hereby incorporated by reference in its entirety as though fully and completely set forth herein.

TECHNICAL FIELD

This disclosure relates to the field of liquid crystal displays and more particularly to methods and systems for increasing dynamic contrast in lower voltage liquid crystal display applications.

DESCRIPTION OF THE RELATED ART

Three-dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, there are two images for each video frame: right and left. The right image must be delivered to only an observer's right eye, and the left image must be delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS switch may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system includes stereoscopic eyewear that is designed such that the left lens will only pass the left state polarization and the right lens will only pass the right state polarization. In this way, separation of the right and left images is achieved.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth, as shown in FIG. 4. Virtual objects may be displayed in this created 3D space, which exists both above the 3D stereoscopic display panel (i.e., negative space) and below the stereoscopic display panel (i.e., positive space).

Liquid Crystal Displays (LCDs)

Some of the advantages of a liquid crystal display (LCD) include lighter weight, lower power consumption, and less radiation contamination. LCD monitors have been widely applied to various portable information products (e.g., user equipment devices such as laptops, tablets, mobile phones, PDAs, and so forth). Typically, in an LCD monitor, incident light produces different polarization or refraction effects when the alignment of liquid crystal molecules is altered. The liquid crystal molecules affect the transmission of the incident light, and thus a magnitude of the light emitted from the liquid crystal molecules varies. The LCD monitor utilizes the characteristics of the liquid crystal molecules to control the corresponding light transmittance and produces images per different magnitudes of red, blue, and green light.

A schematic image of a nematic liquid crystalline phase 1000 is shown in FIG. 2C. The liquid crystal materials have no positional long-range ordering of their molecules' centers of mass, as in crystals. However, the liquid crystal materials possess long-range orientational ordering of their molecules along a main axis direction (in the simplest case of so-called nematic liquid crystal), effectively allowing the molecules to be aligned along one preferred direction, called the director of the liquid crystal, $\vec{n}$ (see FIG. 2C).

Liquid crystal molecules either possess a permanent dipole moment, or acquire the induced dipole moment when placed in an electric field. In both cases, in the electric field a liquid crystal molecule 2000 is characterized by some dipole moment, $\mu$. This dipole may be aligned along the molecule's symmetry axis (such materials are said to have the positive dielectric anisotropy) or perpendicular to it (the negative dielectric anisotropy). The separation of charge in a molecule leads to its rotation in the electric field until it is aligned parallel or perpendicular to the applied field, depending on a sign of the material's dielectric anisotropy. FIG. 2D depicts such re-orientation of a liquid crystal molecule with the positive dielectric anisotropy.

As all of the molecules in the liquid crystalline phase are subject to the re-orientation under the effect of the electric field at the same time, it is possible to control the symmetry axis of the phase (the director) and usually the optical axis of the liquid crystalline sample.

FIG. 2E illustrates the configuration of liquid crystal molecules 300 within a conventional twisted nematic liquid crystal based polarization rotator. The nematic liquid crystal is chosen to have a positive dielectric anisotropy. The left-hand side of the figure illustrates the voltage OFF, 90-degree rotation state. The right-hand side of the figure illustrates the voltage ON, 0-degree rotation state.

Depending on the type of the liquid crystal cell and the relative orientations of the liquid crystal cell's optical axis and the polarizers' transmission axis, the polarization rotator can operate in either Normal White (NW) or Normal Black (NB) mode. These modes are governed by the optical transmission in the zero or low-voltage state, i.e. the Normal White mode corresponds to the maximum optical transmission in the zero or low-voltage state, and the minimum transmission in the high-voltage state; it is the opposite for the Normal Black mode.

The twisted nematic polarization rotator usually operates in the Normal White mode. In this case the higher applied voltage improves the contrast ratio of the Normal White mode due to the decrease of the residual retardation of a liquid crystal cell.

Other type of polarization rotators such as electrically controlled birefringence (ECB) mode can operate both in Normal White and Normal Black modes. Using additional optical elements in the 3D system (such as two orthogonal polarizers), the same polarization rotator can operate in the both modes alternately in each every frame.

SUMMARY

Various embodiments of a system for implementing methods for increasing dynamic contrast in a liquid crystal display (LCD). In some embodiments, an LCD may include a segmented backlight. The segmented backlight may include one or more segments and one or more sets of light emitting diodes (LEDs) configured to illuminate the segmented backlight. Each set of LEDs may illuminate a corresponding segment of the one or more segments. Each segment of the one or more segments may include one or more notches (or cuts) and each notch of the one or more notches may be configured as a light barrier that may reduce light leakage to non-adjacent segments. In some embodiments, the one or more notches, or a subset thereof, may be of variable length, depth, and width. In some embodiments, the one or more notches, or a subset thereof, may be arranged to be perpendicular to the one or more sets of LEDs. In some embodiments, the one or more notches, or a subset thereof, may be three-dimensional, having a width the varies along the depth and length of the notch and a depth that varies along the width and length of the notch. In some embodiments, the one or more notches, or a subset thereof, may be non-linear in a direction perpendicular to the one or more sets of LEDs. In some embodiments, the one or more notches, or a subset thereof, may be reflective (e.g., reflect all light), some degree of opaque (e.g., absorb a portion of light, such as 10%, 20%, 30%, 40%, and so forth up to 99%), or blackened (e.g., darkened to absorb substantially all light). In some embodiments, the LCD may be included in any of a user equipment device, including a wireless phone, table, and/or laptop, a head mounted display device, a desktop computer, and/or any other type of display device. In some embodiments, the LCD may be included in a three-dimensional stereoscopic display system. In some embodiments, the three-dimensional stereoscopic display system may be any of a user equipment device, including a wireless phone, table, and/or laptop, a head mounted display device, a desktop computer, and/or any other type of display device.

BRIEF DESCRIPTION OF THE DRAWINGS

A better understanding of the present disclosure can be obtained when the following detailed description of the preferred embodiment is considered in conjunction with the following drawings, in which:

FIG. 2C illustrates an example of a schematic diagram of a nematic liquid crystalline phase, according to implementations.

FIG. 2D illustrates an example of a schematic diagram of a switching of a liquid crystal molecule in an electric field, according to implementations.

FIG. 2E illustrates an example of a schematic diagram of a configuration of liquid crystal molecules within a conventional twisted nematic liquid crystal based polarization rotator, according to implementations.

FIG. 11 illustrates an example of a segmented backlight, according to some embodiments.

FIGS. 12A-C illustrate an example of a notch in a segmented backlight, according to some embodiments.

FIGS. 13A-C illustrate another example of a notch in a segmented backlight, according to some embodiments.

FIGS. 15A-C illustrate another further example of a notch in a segmented backlight, according to some embodiments.

Figure 1:
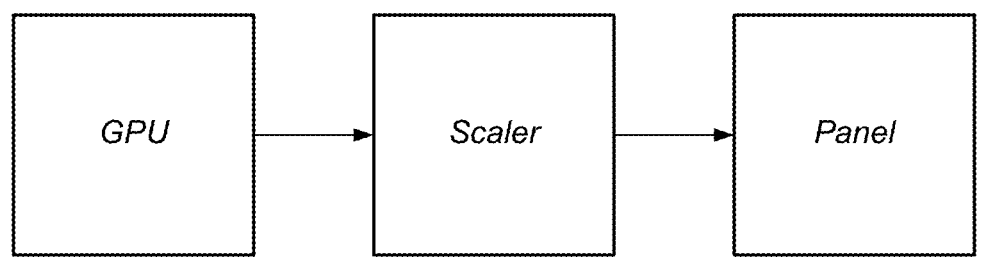
FIG. 1 illustrates a modern display chain, according to implementations.
Figure 2A:
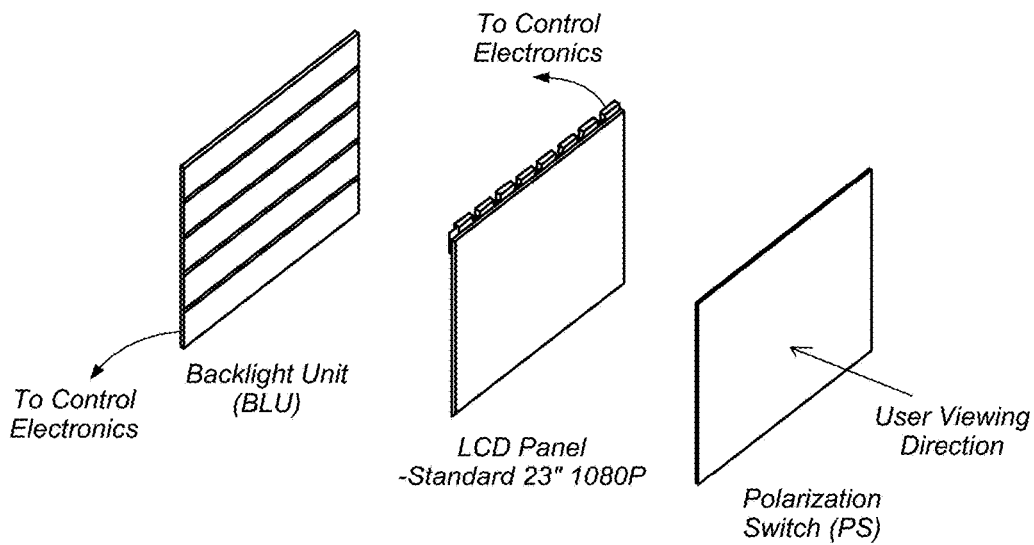
FIG. 2A illustrates an example of an architecture that utilizes a polarization switch, according to implementations.
Figure 2B:
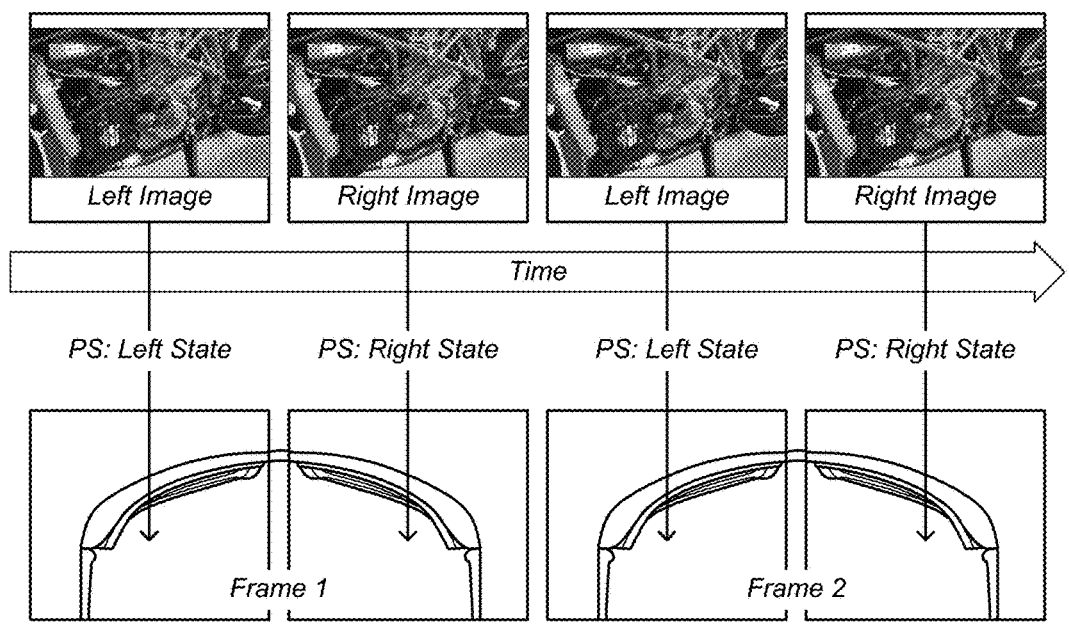
FIG. 2B illustrates an example of a stereo effect (simulated 3D) using polarization switching between left and right views, according to implementations.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element (or Functional Unit)—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Figure 4:
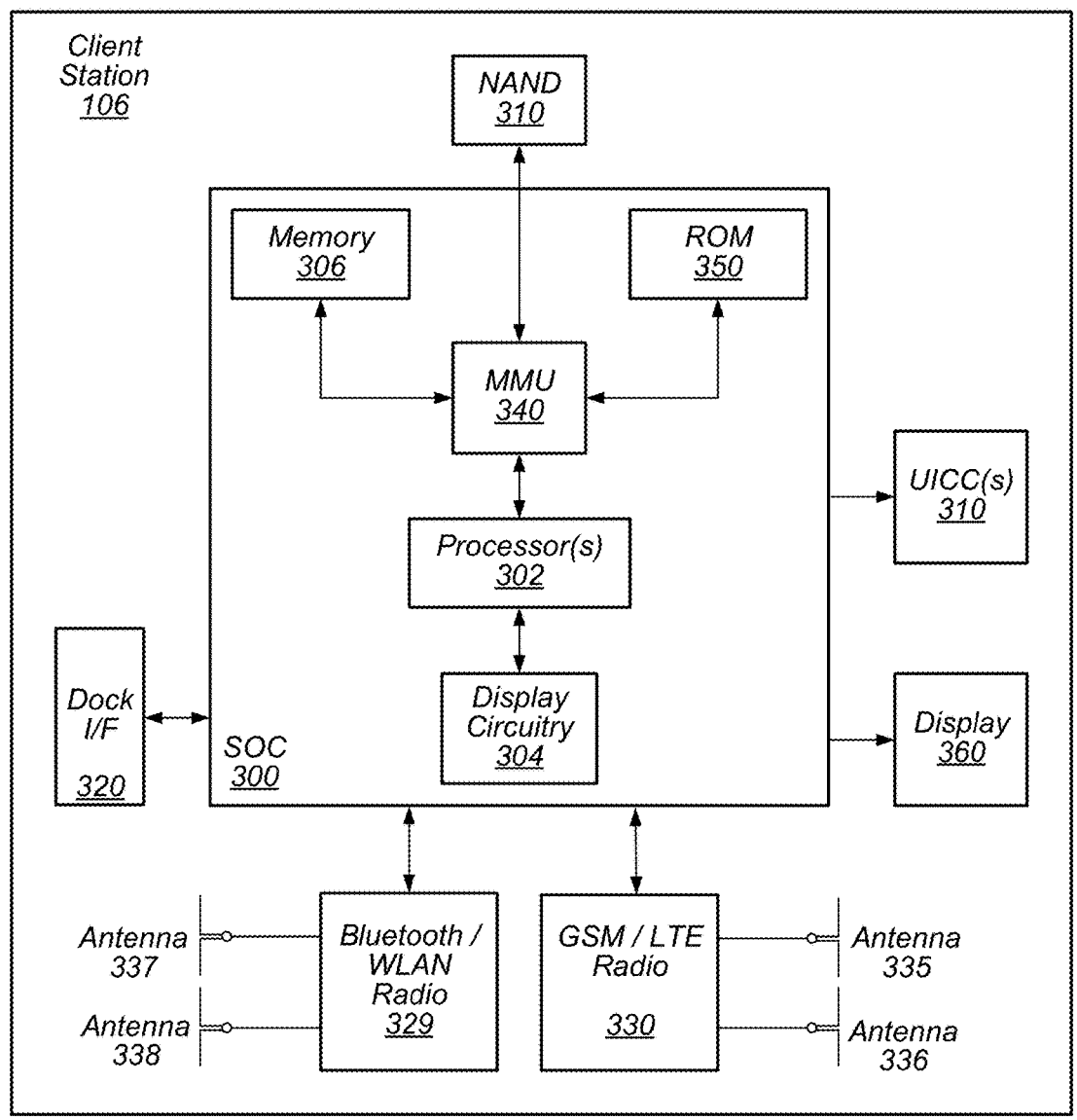
FIG. 4 illustrates an example block diagram of a user equipment device configured according to some embodiments.

Coupled Zone—refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers the display of a 3D object, or content, on a two-dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45-degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Stylus—a peripheral device or element such as a handheld device, handheld pen device, handheld pointing device, hand, finger, glove, or any object used to directly interact with rendered virtual objects as in a stereo rendered virtual projected objects.

Liquid Crystal Device—an electro-optical device that uses a liquid crystal material to manipulate light by the application of a voltage.

Liquid Crystal Light Modulator—a liquid crystal device that manipulates the intensity of light passing through it. An example of a type of liquid crystal light modulator is a liquid crystal display (LCD), which may be pixelated.

Polarization Switch (PS)—a liquid crystal device that manipulates the polarization of light passing through it. Note that the PS does not generally change the intensity of light on its own. It may typically be accomplished when the PS is used in conjunction with an analyzer. An analyzer may be a polarizer that is used to block or pass some predetermined polarization state. For example, an LCD typically has a polarizer on the input side and a polarizer on the output side. The output polarizer is called an analyzer. Eyewear may act as an analyzer in some embodiments.

PS Segment—a segment of a PS that is independently controllable.

Pixel—an individually addressable element of an LCD.

Liquid Crystal Cell or Liquid Crystal Layer—the layer of liquid crystal material enclosed by the top and bottom substrates of an liquid crystal device.

Liquid Crystal Mode—the liquid crystal design used in a liquid crystal device. The design may include the specific type of liquid crystal material, the thickness of the cell, the orientation of the alignment directions, etc. Typical liquid crystal modes include TN, VA (vertical alignment), IPS (In Plane Switching), etc.

Driven State—the term driven state may refer to a higher voltage state of a liquid crystal (e.g., +/−2.5 V, +/−5 V, +/−10 V, +/−12 V, etc.). As an example using a Twisted Nematic (TN) liquid crystal device, the driven state of the +/−10 V may correspond to the position and orientation of the liquid crystal such that the liquid crystal rotates the polarization of polarized light entering the liquid crystal device from the non-driven state in a manner that the polarization of the incoming light equals the polarization of the outgoing light.

Relaxed State—the term relaxed state may refer to the low voltage state of a liquid crystal (e.g., 0 V). As an example using a TN liquid crystal device, the relaxed state of the liquid crystal may correspond to the position and orientation of the liquid crystal liquid crystal such that the polarized light entering the liquid crystal rotates the polarization.

Frame Time—the period that contains one driven state and one relaxed state. The frame time may include two frames worth of data. For example, in a 3D system that alternates between left and right eye frames, a frame time may include one left eye frame and one right eye frame.

Normal White—corresponds to a white optical state at 0V. Thus, normal white corresponds to a normally high luminance state at 0V where light is transmitted through a polarization switch (and liquid crystals). One example of a normal white polarization switch includes 90° twisted nematic liquid crystals. In context of an embodiment using the polarization switch and corresponding eyewear, where the two lenses of the two eyepieces of the eyewear are cross polarized, normal white means that, at the relaxed state of the PS, the lens that is at same polarization to the PS at the relaxed state is normally white (e.g. light passing through the PS is seen through normal white lens.)

Normal Black—corresponds to a black optical state at 0V. Thus, if no voltage is applied, light may not be transmitted through a polarization switch (and liquid crystals). A PS may be used in both a normal black and normal white mode simultaneously. For example, in a 3D system that alternates between left and right eye images, one eye may be the normal black eye and the other may be the normal white eye. Eyewear (e.g., passive eyewear or shutter glasses) may be used in conjunction with such a system. In context of an embodiment using the polarization switch and corresponding eyewear, where the two lenses of the two eyepieces of the eyewear are cross polarized, normal black means that, at the driven state of the PS, the lens that is at same polarization to the PS at the driven state is normally black (i.e. light passing through the PS is seen through normal black lens.)

Optical Bounce—A temporary increase or decrease in the optical response of a liquid crystal device due to backflow effect in certain liquid crystal configurations. The optical bounce may appear as an oscillation in the transmission-time curve after an electric or magnetic field has been removed from a liquid crystal cell. Therefore, optical bounce may include a delay in reaching the relaxed state and an unintended optical effect as well. The optical effect may result in light leakage in the white normal state and a drop in luminance in the black normal state.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including."". As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc. —these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 3-6 Exemplary Systems

Figure 3A:
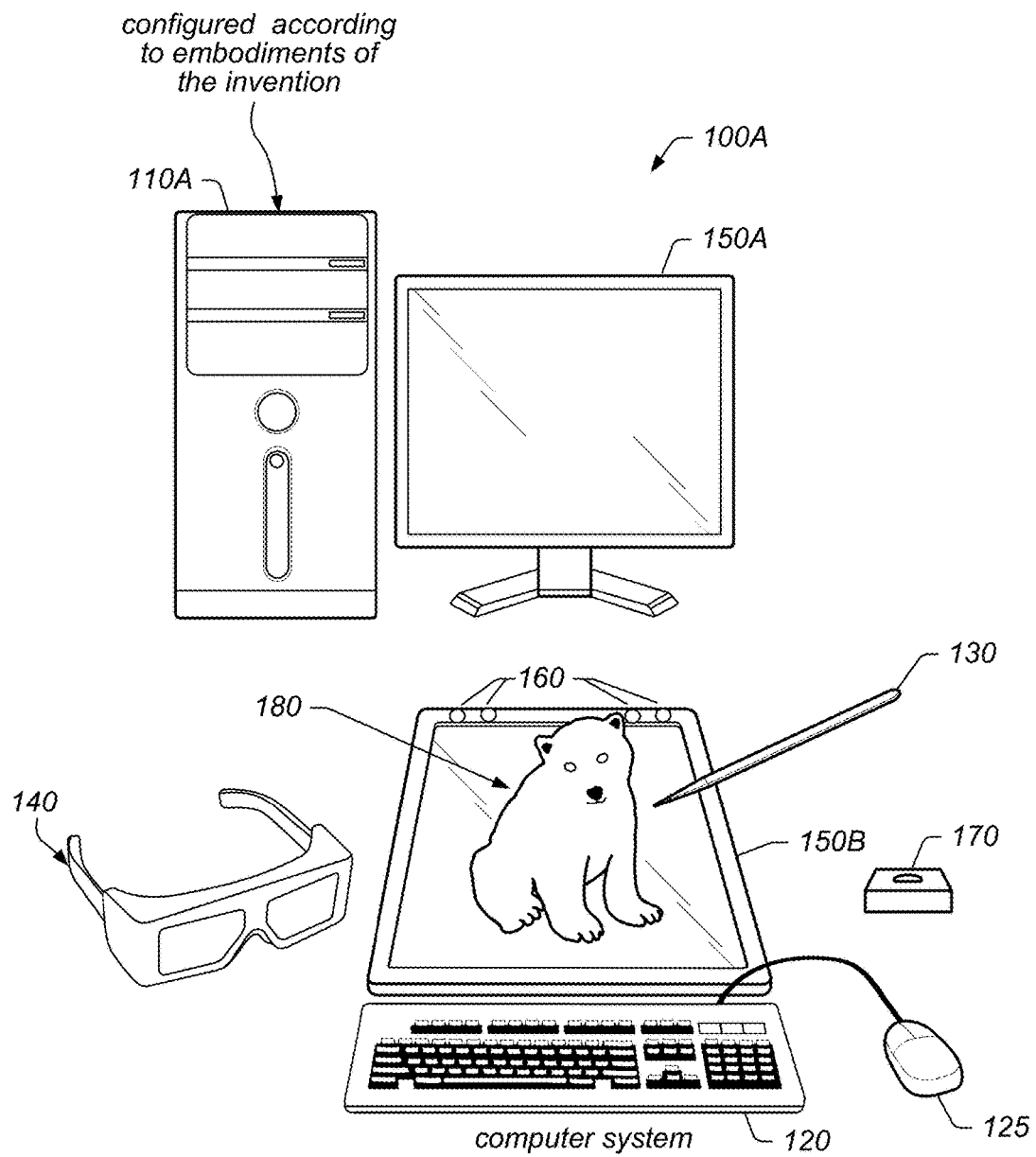
FIGS. 3A and 3B illustrate examples of 3D stereoscopic display systems configured according to some embodiments.
Figure 3B:
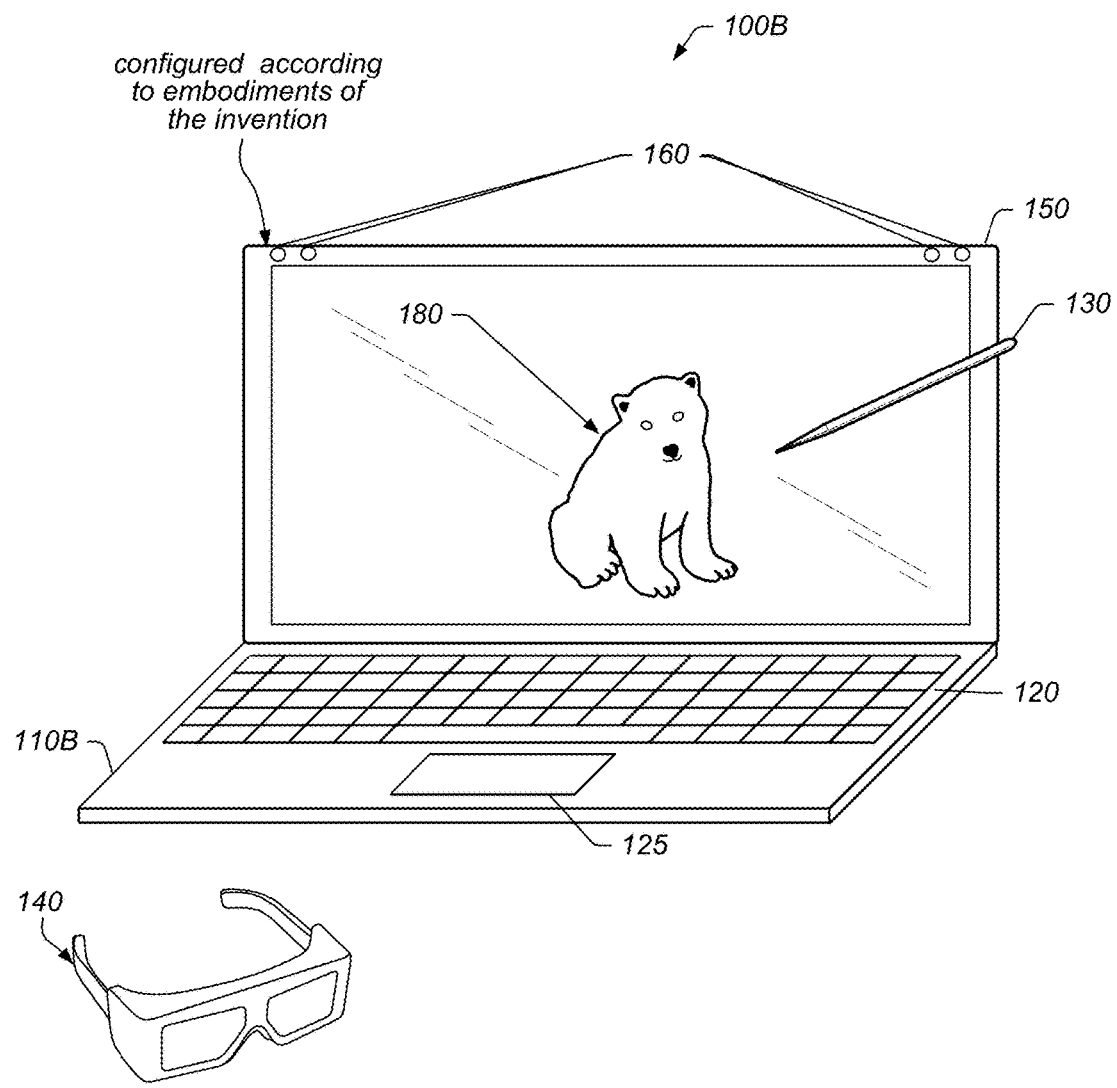

FIGS. 3A and 3B illustrate exemplary systems configured to implement various embodiments of the techniques described below.

In the exemplary embodiment of FIG. 3A, computer system 100A may include chassis 110A, display 150A and display 150B (which may collectively be referred to as display 150 or "one or more displays" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110A may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100A may be configured to display a three-dimensional (3D) scene (e.g., via stereoscopic images), or 3D content, such as scene 180, using the display 150A and/or the display 150B. The computer system 100A may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 3A is exemplary only, and other numbers of displays are also envisioned. For example, the computer system 100A may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110A) to provide images which are presented according to a vertical (or central) perspective and the display 150B may be used (e.g., via instructions sent by a graphics engine executing in the chassis 110A) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two-dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100A. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100A. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100A may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100A, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100A may also include a caddy 170 to store user input device 130. Caddy 170 may also be used to calibrate the orientation of the stylus to a known roll, pitch, and yaw, and so may be in a fixed position relative to cameras 160.

In one embodiment, the system 100A may be configured to couple to a network, such as a wide area network, via an input. The input may be configured to receive data (e.g., image data, video data, audio data, etc.) over the network from a system similar to system 100A. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110A to determine a position or a POV, e.g., via execution of one more programs by or on a processor or functional unit of chassis 110A, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110A may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110A.

Thus, the system 100A may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100A may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100A is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100A) may be used as desired.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device.

In the exemplary embodiment of FIG. 3B, computer system 100B may include chassis 110B which may include display 150, keyboard 120, trackpad or touchpad 135, and at least two cameras 160. The computer system 100B may also include user input device 130 and eyewear 140. Note that in some embodiments, computer system 100B may be wireless or mobile station, e.g., such as a wireless station 106 further described below. For example, computer system 100B may be or included on mobile telephones or smart phones (e.g., iPhone™, Android™-based phones), tablet computers (e.g., iPad™, Samsung Galaxy™, etc.), laptop computers (e.g., MacBook™), portable gaming devices (e.g., Nintendo DS™, PlayStation Portable™, Gameboy Advance™, iPhone™), portable Internet devices, and/or other handheld devices. In various embodiments, at least one of the display 150 may be a stereoscopic display. It is noted that a stereoscopic display may also be configured to display two-dimensional (2D) objects and may be configured to operate in a 2D mode.

The chassis 110B may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100B (or more specifically, chassis 110B) may be configured to display a three-dimensional (3D) scene (e.g., via stereoscopic images), or 3D content, such as scene 180, using the display 150. The computer system 100B may also be configured to display a "view" of the 3D scene using the display 150. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

In some embodiments, the display 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others.

In some embodiments, eyewear 140 may be used as a position input device to track the user view (e.g., eyepoint or point of view (POV)) of a user viewing a 3D scene presented by the system 100B. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display 150 and the point of view of the user may be used to map a portion of the virtual space to the physical space of the system 100B. In essence, the physical space and components used may be mapped to the virtual model in order to accurately render a 3D scene of the virtual space.

One or more of the user input devices (e.g., the keyboard 120, the trackpad 135, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3B illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100B, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination.

In some embodiments, the system 100B may be configured to couple to a network, such as a wide area network, via an input or interface (wired or wireless). The input may be configured to receive data (e.g., image data, video data, audio data, etc.) over the network from a system similar to systems 100A or 100B. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110B to determine a position or a POV, e.g., via execution of one more programs by or on a processor or functional unit of chassis 110B, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display 150. A view of the 3D scene may be presented based on the virtual viewpoint, either by one or more of the display 150 or another display, as desired. This view of the 3D scene may be stereoscopic or monoscopic, as desired.

A 3D scene generator (e.g., content processing system) stored and executed in the chassis 110B may be configured to dynamically change the displayed images provided by the display 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110B.

Thus, the system 100B may present a 3D scene with which the user may interact in real time. The system may include real-time electronic display 150 that may present or convey perspective images in the open space, and user input device 130 that may allow the user to interact with the 3D scene with hand controlled or hand-held tools. The system 100B may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the position of the reference screen, a sound volume for the reference screen, brightness of the screen, and the size of the screen. If the input module 240 is included in a second electronic device, the input module 240 may not be provided in the electronic device according to various embodiments of the present disclosure.

FIG. 4 illustrates an example simplified block diagram of a wireless station 106. According to embodiments, wireless station 106 may be a user equipment (UE) device, a mobile device and/or mobile station. Wireless station 106 may be used in conjunction with the system described above in reference to FIGS. 3A and 3B and the systems described below in reference to FIGS. 5B and 5C. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a Wi-Fi, Bluetooth, or Bluetooth low energy connection) or via a wired interface such as a universal serial bus interface, among other wired interfaces. In some embodiments, wireless station 106 may be included in a computer system, such as computer system 100B described above.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
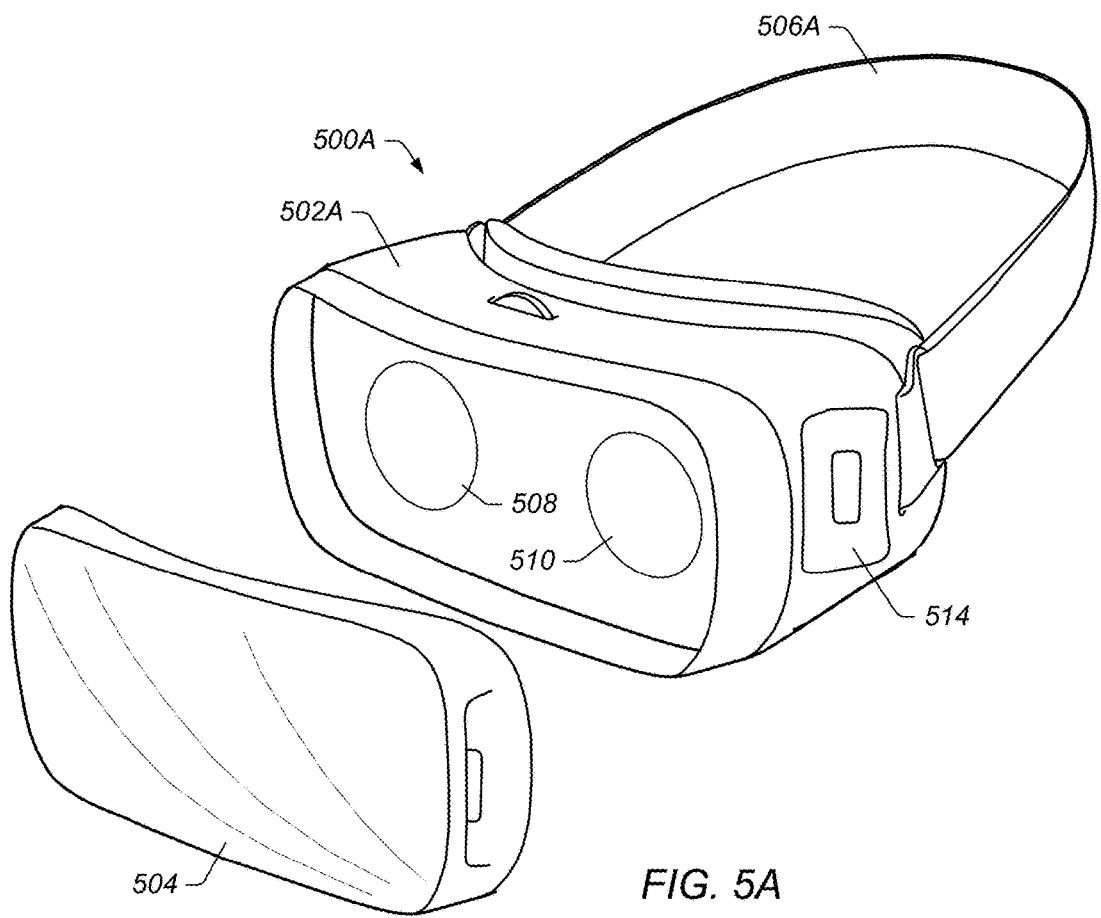
FIGS. 5A and 5B illustrate examples of a 3D head-mounted stereoscopic display system configured according to some embodiments.

Referring to FIG. 5A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 5B:
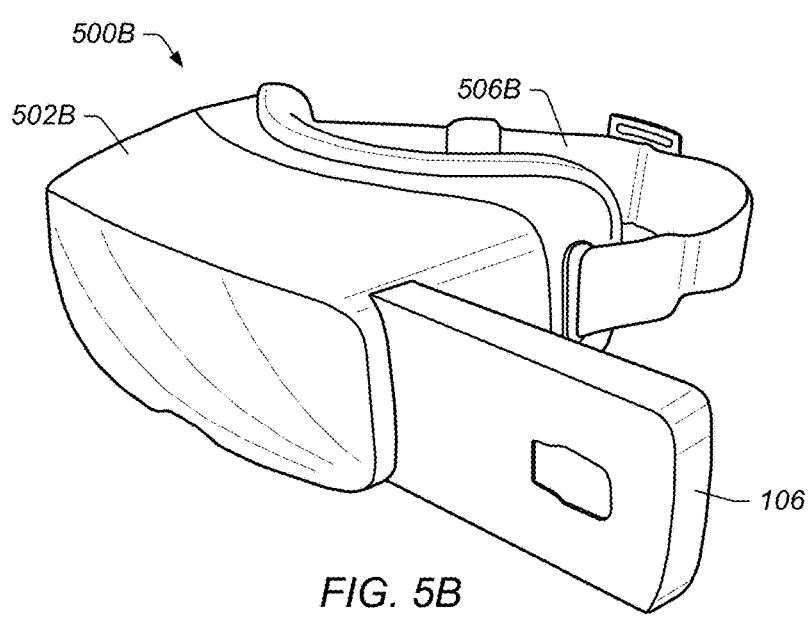

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 5C:
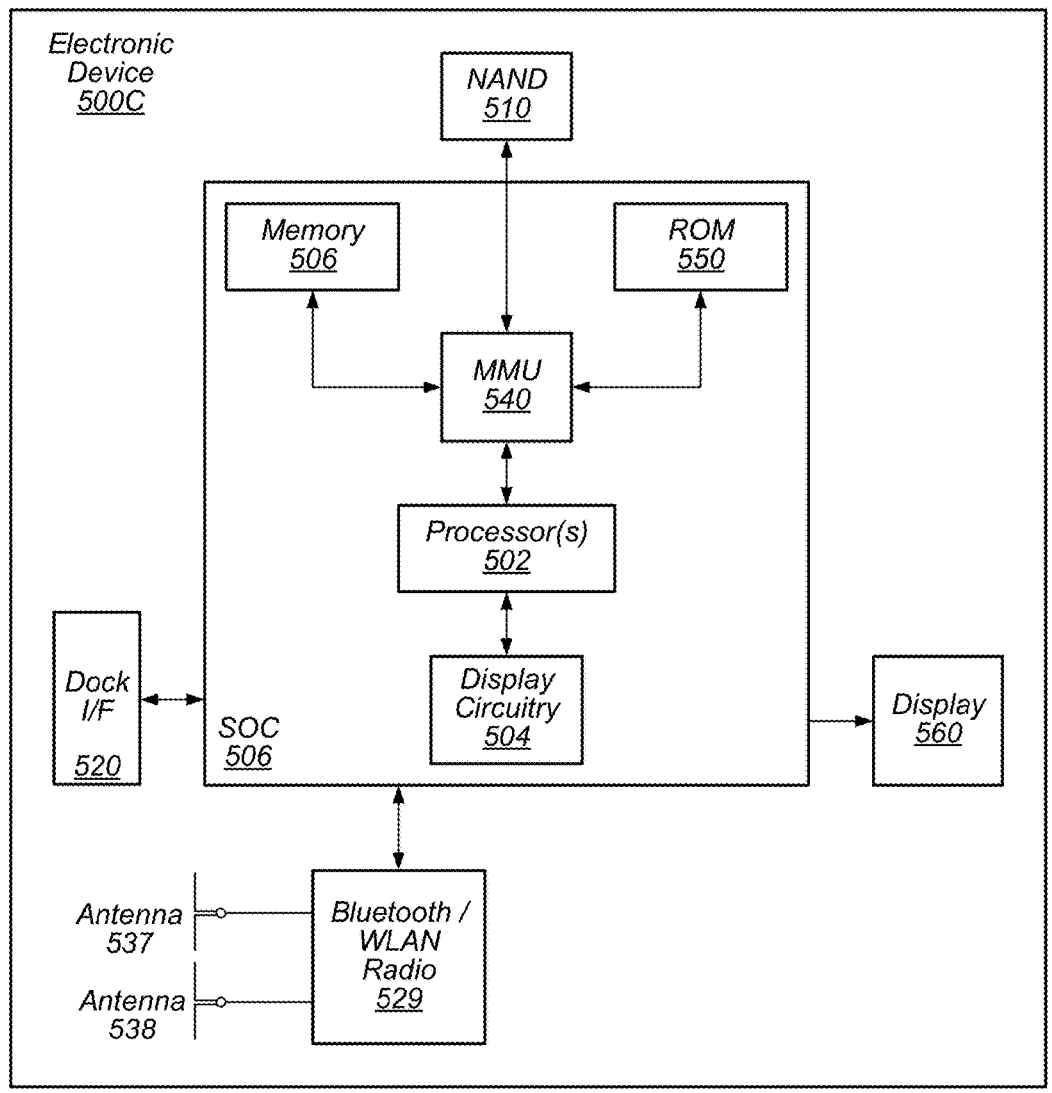
FIG. 5C illustrates an example block diagram of a head-mounted electronic device configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a 3D display system such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In some embodiments, electronic device 500C may include or be in communication with one or more external cameras. For example, electronic device 500C may include (or be in communication with) one or more cameras (or an array of cameras) that may be configured to capture images of a physical location of a user.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
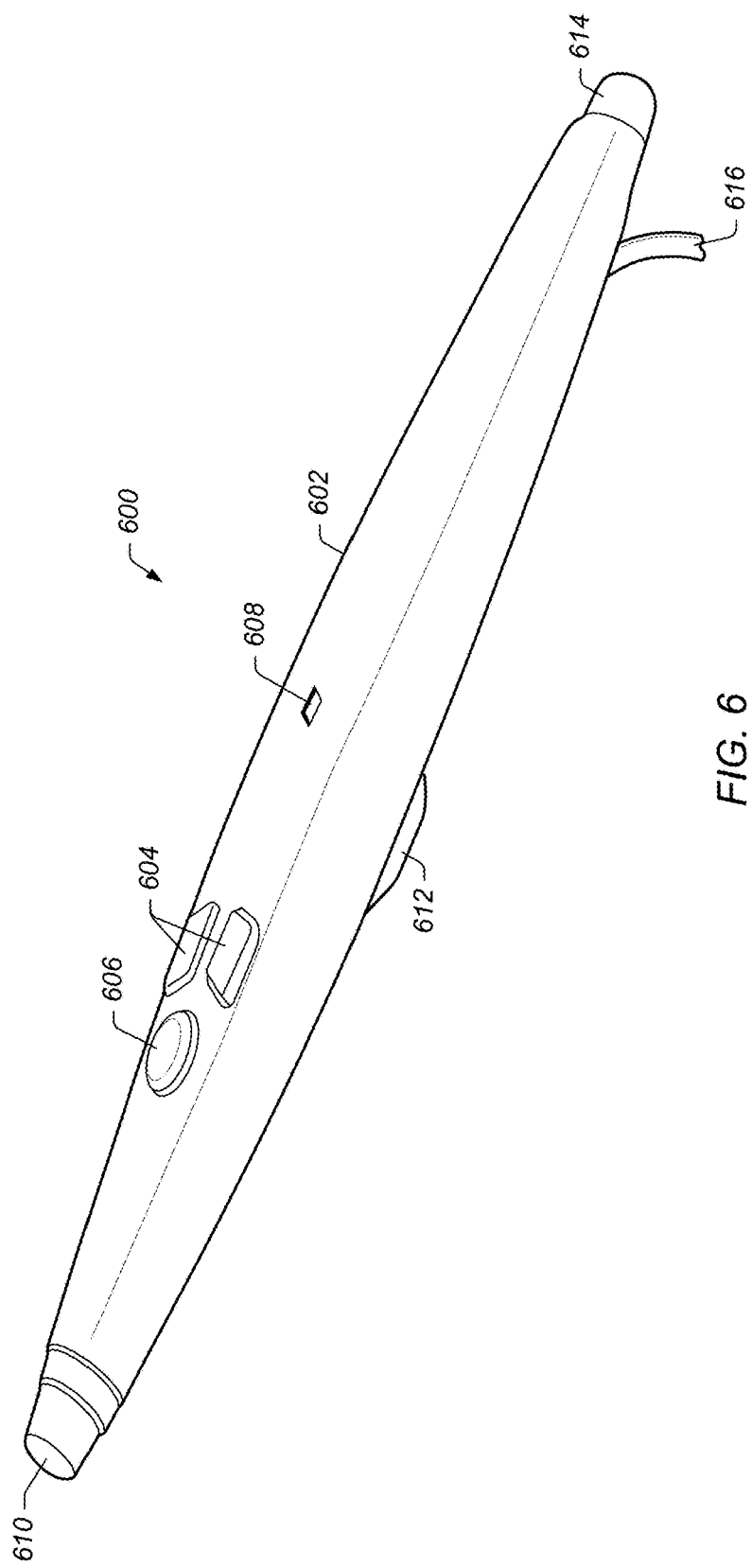
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, system 100 or systems 500 and 550. As described above, systems 100, 500, and 550 may have the capability to determine the six-axis position and orientation of user input device 600. Note that this includes the X, Y, Z location of tip 610 of user input device 600 and the a, (3, y angular orientation of body 602 of user input device 600. However, it should be further noted that user input device 600 is exemplary, and that other user input devices, suitably configured, may be used as desired.

As shown, user input device 600 may include buttons 604, 606, and 612. One of the buttons, such as button 606, may be depressed and held down to trigger the selection of an object within a 3D scene presented by any of systems 100, 500, and 550. Additionally, system 100 may be configured to display a virtual "laser like" projection from tip 610 to the selected object. With the object selected, adjustment of the position and/or orientation of user input device 600 may change the position and/or orientation of the object. Thus, movements of the user input device 600 may result in corresponding translations and/or rotations of the object.

Figure 7A:
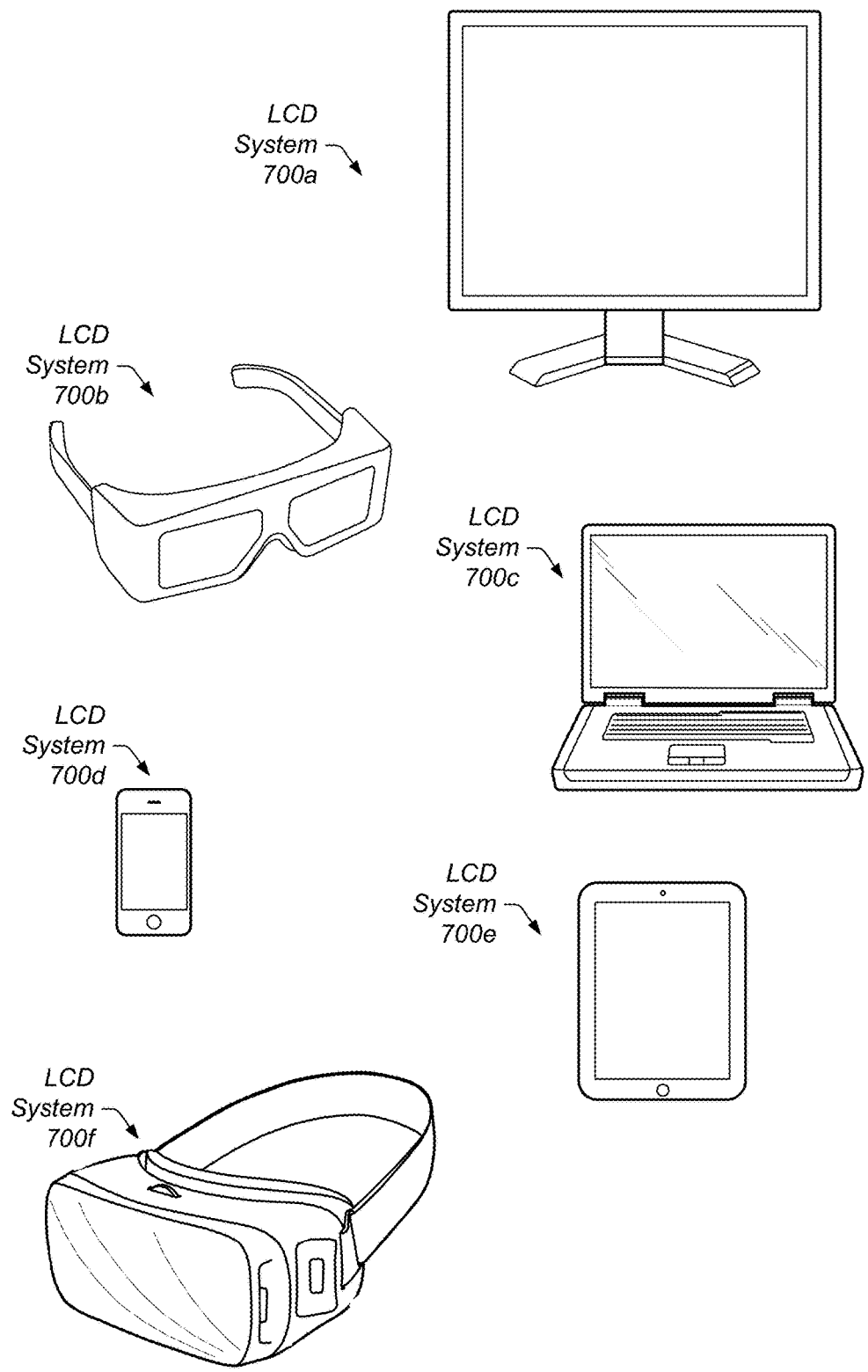
FIG. 7A illustrates example liquid crystal display systems, according to some embodiments.
Figure 7B:
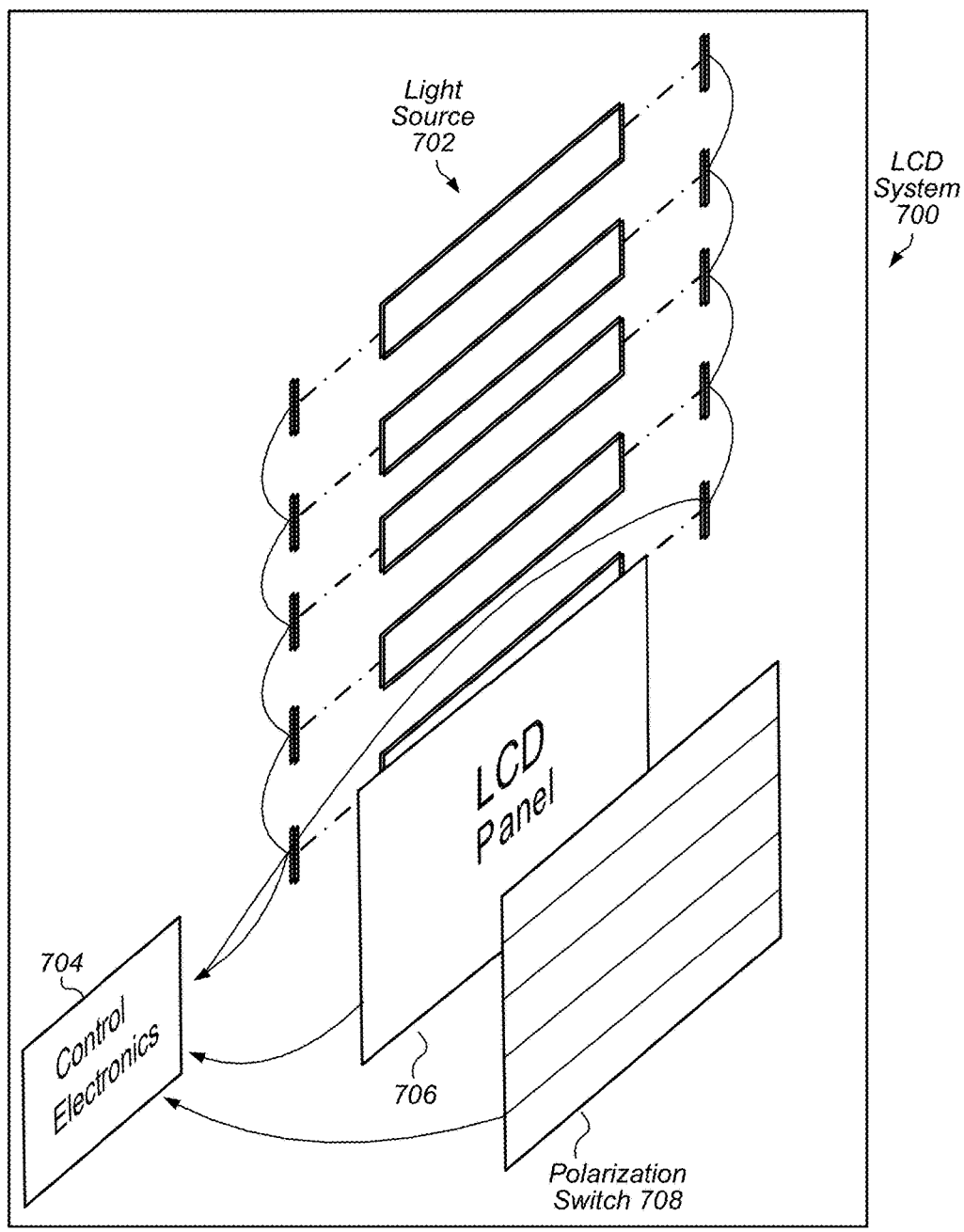
FIG. 7B illustrates an example block diagram of a liquid crystal display system, according to some embodiments.
Figure 8:
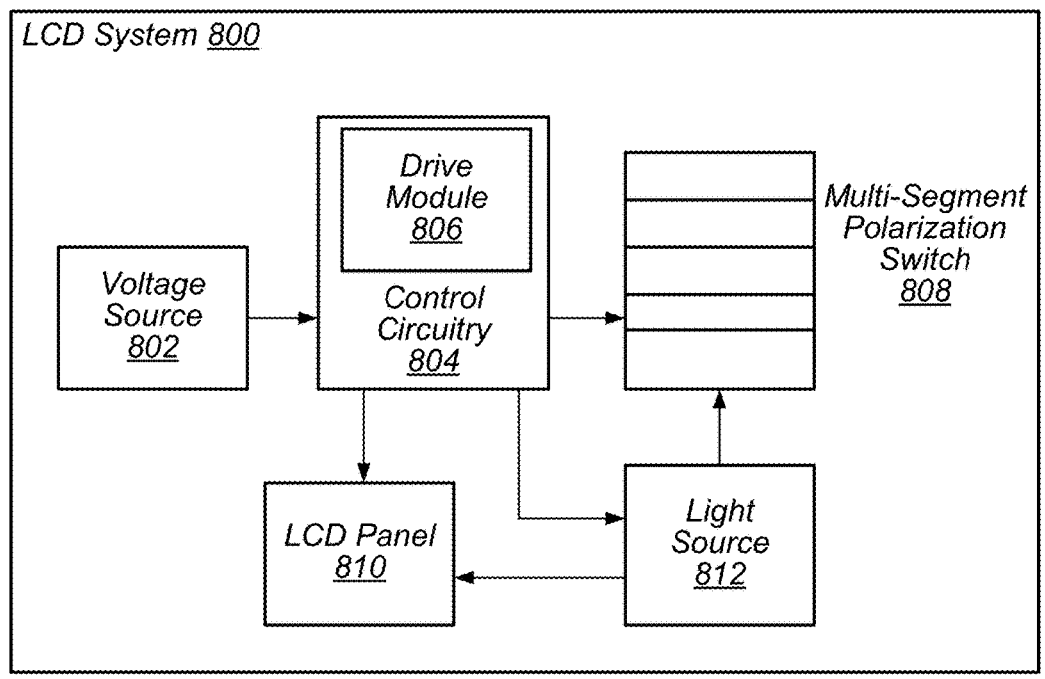
FIG. 8 is an example of a block diagram of a liquid crystal display system, according to some embodiments.

FIGS. 7A-B and 8—Exemplary LCD Systems

FIG. 7A illustrate example liquid crystal display (LCD) systems that may incorporate a variable drive voltage, and which may be configured with various embodiments described below. As examples of LCD systems, FIG. 7A illustrates an LCD monitor 700a (e.g., an LCD computer monitor and/or an LCD television) which may be included in a computer system such as computer system 100A described above, shutter glasses 700b, as well as user equipment devices (UEs) 700c-e (e.g., portable computer 700c, mobile phone 700d, and tablet 700e) which may be included in computer system such as computer system 100B described above, and head mounted display 700f. Other systems that drive twisted-nematic junctions may also incorporate a variable drive voltage, such as an organic light emitting diode (OLED) system that includes a polarization switch. In some embodiments, LCD systems 700a-f may include light source 702, control circuitry 704, LCD panel 706, and a liquid crystal device, such as polarization switch 708 as further described below in reference to FIG. 7B.

FIG. 7B illustrates an example of a schematic diagram of an LCD system, such as system 700, according to some embodiments. Note that LCD system 700 may be included in any of the systems described above. In some embodiments, light source 702 may be coupled to (or in communication with) control electronics (circuitry) 704, LCD panel 706, and polarization switch 708. Light source 702 may receive power and/or control indications from control circuitry 704. In turn, light source 702 may provide light to LCD panel 706 and polarization switch 708. Light source 702 may be referred to as a backlight. In some embodiments, light source 702 may include a plurality of light emitting diodes (LEDs) that may provide pulses of light to various components of LCD system 700. The backlight may, in various embodiments, be segmented (e.g., as further described below). In some embodiments, the backlight may be segmented into a plurality of independently addressable rows (e.g., 4, 5, 8, 10, 16, and so forth). For example, light source 702 may be segmented into sections that may extend (at least partially) across horizontal bands of the display. The LEDs of light source 702 may pulse at different times, which may be optimized for timing one segment's pulse separate from other segments. Further, a segmented light source 702 may include segmented light guides that may help minimize row-to-row crosstalk. Light source 702 may be positioned in LCD system 700 behind LCD panel and polarization switch from the perspective of the front of LCD system 700 (e.g., where a user/viewer would be located). In some embodiments, the LEDs may be edge LEDs that provide illumination from both sides of LCD system 700. Light source 702 may redirect the illumination from the edge LEDs so that the illumination may be perpendicular to LCD panel 706 and polarization switch 708. LCD system 700 may additionally include an enclosure that may include heatsinks for the LEDs. In that manner, heat produced by the LEDs may be dissipated and alleviate the effects on other LCD system 700 components, such as polarization switch 708. As described herein, light source 702 may be shifted, or extended, in conjunction with the variable drive voltage, according to some embodiments. In an embodiment in which the system is shutter glasses, the shutter glasses may not require any backlight pulsing. As such, an accompanying LCD as part of such a system may include a backlight capable of being pulsed, or in some embodiments, it may include a light source that is incapable of being pulsed (e.g., a cold cathode fluorescent light (CCFL)).

In some embodiments, LCD system 700 may include control circuitry 704. Control circuitry 704 may receive a voltage from a voltage source (not shown). Control circuitry 704 may, in turn, provide one or more voltages and/or other indications to light source 702, LCD panel 706, and/or polarization switch 708. As an example, control circuitry 704 may provide a voltage and a backlight enable indication to light source 702, which, in turn, may cause light source 702 to provide a light pulse to LCD panel 706 and polarization switch 708. In some embodiments, control circuitry 704 may independently address different segments of light source 702, LCD panel 706, and polarization switch 708. For example, control circuitry 704 may provide a voltage and a backlight enable indication to a backlight driver board (not shown) of light source 702. Light source 702 may then provide appropriate pulsed voltages to each independently addressable segment of light source 702. In some embodiments, control circuitry 704 may provide a pulsed voltage directly to each segment of LEDs, without necessarily providing the voltage to a backlight driver board. The addressed light source 702 segment may then provide one or more light pulses to LCD panel 706, and polarization switch 708. Control circuitry 704 may include circuitry to implement one or more variable drive voltages to polarization switch 708, according to some embodiments.

LCD panel 706 may include a plurality of pixels that may collectively produce images. The plurality of pixels of the LC panel may be addressed with data that conveys the image to be displayed. In some embodiments, LCD panel 706 may be updated from one frame to the next in a progressive scan manner, and hence updating may not occur all at once. In such embodiments, the pixels of LCD panel 706 may be updated, for example, sequentially by row from top to bottom. As an example, LCD panel 706 may refresh at a frequency of 120 Hz (or, in some embodiments 240 or 480 Hz). For a 120 Hz system, every 8.3 ms the entire panel's data may be updated. As another example, for a 240 Hz system, every 4.1 ms the entire panel's data may be updated. Similarly, for a 480 Hz system, every 2.0 ms the entire panel's data may be updated. The transition from one frame to another may proceed as a progressive scan and the scan may start at the top row and then proceed through the rest of the rows. In some embodiments, the time difference from updating the top row to updating the bottom row may be approximately 5-6 ms. Accordingly, the scan time to write frame data to LCD panel 706 may take a large portion of each frame. As a result, the portion of each frame where the entire display is in the same state may be minimal. The subsequent frames may be a left eye frame (image) followed by a right eye frame (or vice versa) for a 3D display, or may simply be sequential frames for a 2D display. In some embodiments, backlight and polarization switch segmenting may be applied to maintain synchronization with the progressive scan data write of LCD panel 706. As described herein, an OLED panel may be used in LCD system 700 instead of LCD panel 706 and light source 702.

LCD system 700 may include a liquid crystal device, such as polarization switch 708. Polarization switch 708 may use a twisted-nematic liquid crystal mode and may include a plurality of distinct individually addressable elements, called segments. Polarization switch 708 may receive one or more voltages from control circuitry 704 and may receive a light pulse from light source 702. As was the case with light source 702, polarization switch 708 may be segmented into horizontal bands. Polarization switch 708 may be used in LCD system 700 to simultaneously provide a normal black and normal white mode, when used in conjunction with the appropriate eyewear, wherein each eye has the appropriate lens. For instance, in the context of an embodiment using the polarization switch and corresponding eyewear, where the two lenses of the two eyepieces of the eyewear are cross polarized, a normal white mode may be provided in a 3D LCD system 700 for one eye, while concurrently a normal black mode may be provided for the other eye. Polarization switch 708 may control the luminance of LCD system 700. Thus, a normal white mode may allow full luminance in a low voltage state (e.g., 0V) of polarization switch 708 while normal black mode may block all luminance for the corresponding lens of the eyewear. Conversely, a normal white mode may block all luminance in a driven voltage state (e.g., +/−2.5V, +/−5V, +/−10V, and/or +/−12V), while a normal black mode may allow full luminance for the corresponding lens of the eyewear. Accordingly, in a 3D context, one eye may see an image or frame in a normal white mode while the other eye sees an image or frame in a normal black mode. In some embodiments, polarization switch 708 may be a multi-segment polarization switch, as described herein.

FIG. 8 is an example of a block diagram of an LCD system, according to some embodiments. LCD system 800 may be schematically similar to or the same as LCD system 700 of FIG. 7B and may be configured with various embodiments described below.

LCD system 800 may include voltage source 802, control circuitry 804, liquid crystal devices, such as a polarization switch 808, shown as segments of a multi-segment polarization switch, LCD panel 810, and light source 812. Control circuitry 804 may include drive module 806. In some embodiments, voltage source 802 may be a power supply for LCD system 800 or may receive one or more voltages from an external power supply. Voltage source 802 may output one or more voltages. The one or more voltages may be provided to control circuitry 804. In some embodiments, voltage source 802 may also provide one or more voltages directly to LCD panel 810, light source 812, a polarization switch 808, or other components (not shown) of LCD system 800. The one or more voltages may be provided to control circuitry 804, and, in turn, to the polarization switch 808, may be a drive voltage. The illustrated embodiment shows control circuitry 804 and voltage source 802 as separate modules, yet, in some embodiments, voltage source 802 may be a subcomponent of control circuitry 804.

In some embodiments, control circuitry 804 may receive the voltage from voltage source 802 and provide a drive voltage to the polarization switch 808. The drive voltage provided to the polarization switch 808 may be provided to a liquid crystal addressable element of the polarization switch, or other liquid crystal device. In some embodiments, the drive voltage may be +/−5 V. In other embodiments, the drive voltage may be +/−2.5V, +/−10V, or +/−12V, for example. In some embodiments, the drive voltage may maintain an overall DC bias of 0V across the liquid crystal addressable element over time. Control circuitry 804 may include drive module 806. Drive module 806 may include a programmable waveform generator. In some embodiments, drive module 806 may vary the drive voltage it provides to the one or more polarization switches 808 as a function of time. For example, the drive voltage may include a driven function portion and a relaxed function portion. The driven function may correspond to the portion of the drive voltage when transitioning from a low, or relaxed voltage, to a high, or driven voltage. Similarly, the relaxed function may correspond to the portion of the drive voltage when transitioning from a driven voltage to a relaxed voltage. In some embodiments, the driven function may be a normal step function while the relaxed function may be one or more of a number of alternative functions, not equivalent to a step function. In some embodiments, the relaxed function may be continuous, e.g., in an analog manner. For instance, the relaxed function may be a decreasing portion of a Gaussian or cosine function. In some embodiments, the drive voltage function(s) may vary from frame to frame. For instance, liquid crystal response time may vary as a function of temperature. Accordingly, control circuitry 804 may include a temperature sensor that may affect the voltage level and/or shape of the drive voltage waveform.

Further, in various embodiments, the relaxed function may rapidly reduce the drive voltage to an intermediate voltage before slowly reducing the drive voltage from the intermediate voltage a relaxed voltage (e.g., 0V, corresponding to the relaxed state). For example, if the driven voltage level is +/−5V, the relaxed function may rapidly reduce the voltage to +/−0.5V and then slowly reduce the voltage to 0V. Thus, the reduction may occur at different rates, for example a first and second rate, with the second rate being lower than the first rate. In such embodiments, control circuitry 804 may drive the polarization switch 808 at full rate, then transition to a lower intermediate drive voltage in anticipation of the transition to the relaxed state. The intermediate drive voltage may be close to the threshold of the relaxed state, yet the one or more polarization switches may maintain optical properties consistent with the driven state. Maintaining the optical properties consistent with the driven state is used herein to mean that the normal black mode should allow approximately full luminance and the normal white mode should block approximately all luminance. The threshold of the relaxed state may be approximately 0.2-2V. In some embodiments, the relaxed function may consist of small decremented step functions that approximate a continuous waveform.

The drive voltage applied to the polarization switch 808 may present as a variety of different waveforms and timings. For example, the waveform could be an arbitrary descending waveform, a linear descending ramp, or other waveform. Some factors that may be considered in determining the waveform and timing may include: contrast level, the presence of ghosting/crosstalk, balance between left and right eye performance, and color in bright and dark states. In some embodiments, the drive voltage swing and offset may be varied. Further, in some embodiments, the drive voltage may be a pulse-width modulated (PWM) waveform, as described herein.

In some embodiments, different drive voltages may be provided to different segments, of a segmented polarization switch 808. For instance, as described herein, a polarization switch 808 may be segmented into five different segments. A different phase-shifted drive voltage, each of which may have a function (e.g., cosine) applied to the high-low-voltage transition, may be provided to each of the segments. As an example, the provided voltage may be independently driven to provide each segment with an independent and time-shifted voltage from the independently driven voltages being provided to each other segment. In such an embodiment, the timing of the polarization switch transitions may be synchronized with the timing of the backlight pulses and the data of the frames.

In some embodiments, control circuitry 804 may supply one or more voltages and/or other indications to LCD panel 810 and light source 812, in addition to, the one or more polarization switches 808. The voltages may be driven in a different manner than the one or more voltages provided to polarization switches 808. As an example, control circuitry 804 may provide a voltage, and a power-on indication to LCD panel 810 and/or light source 812. Control circuitry 804 may also provide a backlight enable indication to light source 812. Control circuitry 804 may, in some embodiments, receive an indication of data writes to LCD panel 810, from LCD panel 810, or from another source (e.g., an external source such as a set-top box, Ethernet, Wi-Fi, DVD player, Blu-Ray player, etc.). Control circuitry 804 may include circuitry to synchronize the drive voltage to the one or more polarization switches and to left and right frame timing. Control circuitry 804 may further include circuitry to synchronize backlight enable indications with left and right frame timing. Accordingly, the variable drive voltage, described herein, may be used in conjunction with a shifted or extended backlight, to enhance the benefits of the variable drive voltage. The extended backlight may be segmented, where each of the subsidiary segments of the main backlight pulse may be shifted accordingly. In some embodiments, and not shown in FIG. 8, control circuitry 804 may receive video, manipulate and process the video, and provide it to the LCD panel 810.

In some embodiments, one or more polarization switches 808, or other liquid crystal device with one or more liquid crystal addressable elements, may receive the drive voltage from control circuitry 804 (and drive module 806). As described above, the drive voltage may have a function applied to it before reaching polarization switches 808. In some embodiments, the one or more polarization switches 808 may receive a drive voltage directly from voltage source 802, which may or may not apply a function to the drive voltage. Polarization switches 808 may be a liquid crystal device, such as twisted-nematic panel, homogeneous cells, chiral-homeotropic liquid crystal cells, optically compensated birefringence (OCB) cells, pi-cells, etc. Twisted-nematic panels have cells which may twist up to a full 90 degrees in response to a voltage change, to allow varying degrees of light to pass through.

In various embodiments, LCD system 800 may include only a single polarization switch. The polarization switch 808 may cover the entire display of LCD system 800. Accordingly, the single polarization switch 808 may change the polarization state of the light emitted by the display. For a 3D display, this may correspond to two different states: one polarization state that is passed by the right eye polarizer and blocked by the left eye polarizer and another polarization state that is passed by the left eye polarizer and blocked by the right eye polarizer. The polarization switch 808 may be segmented, for example, into horizontal sections, similar to the backlight segmenting described herein. Accordingly, by segmenting the polarization switch into horizontal sections, the correct polarization state may be achieved for corresponding data on LCD panel 810 at a given time. As one example, the polarization switch 808 may be divided into five horizontal sections of equal size. The various segments of polarization switch 808 may be synchronized or timed according to the progressive-scan-based panel write times. In some embodiments, a polarization switch 808 may switch states when the first row of the segment receives new data (i.e., when LCD panel 810 begins to write data to that row).

LCD panel 810 may include a plurality of pixels that may collectively produce images. The plurality of pixels may be addressed with data that may reflect the image to be display. As discussed herein, LCD panel 810 may be updated from one frame to the next in a progressive scan manner and may not occur all at once. In such an embodiment, the pixels of LCD panel 810 may be updated, for example, sequentially by row from top to bottom. As an example, LCD panel 810 may refresh at a frequency of 120 Hz (or at higher rates such as 240 Hz and/or 480 Hz). For a 120 Hz system, every 8.3 ms the entire panel's data may be updated. In some embodiments, the time to update the entire panel, from the top row to the bottom row, may be approximately 5-6 ms. Accordingly, the scan time to write frame data to LCD panel 810 may take a significant time percentage of each frame and the portion of each frame where the entire display is in the same state may likewise be minimal. In some embodiments, backlight and polarization switch segmenting timing and/or segmenting may be applied to maintain synchronization with the progressive scan data write of LCD panel 810.

In some embodiments, LCD system 800 may include a light source 812. Light source 812 may provide an instance (e.g., a pulse) of the light source to the polarization switch 808. Light source 812 may be a backlight, such as incandescent light bulbs, fluorescent lamps, or one or more light emitting diodes (LEDs). Light source 812 may include one or more white backlights or different colored backlights (e.g., RGB LEDs). Light source 812 may be positioned in LCD system 800 behind LCD panel 810 and polarization switch 808 from the perspective of the front of LCD system 800 (where the viewer would be). In some embodiments, the LEDs may be edge LEDs that provide illumination from both sides of LCD system 800. Light source 812 may include a manner in which to redirect the illumination from the edge LEDs so that the illumination may be perpendicular to LCD panel 810 and polarization switch 808.

In some embodiments, light source 812 may pulse twice per frame time (i.e., once for a left eye frame and once for a right eye frame), with each pulse being a pulse of limited duration. For example, starting with a driven state, a first pulse of light source 812 may occur after the drive voltage reduction from the driven state begins. Specifically, in one example, the first pulse may take place during the voltage transition from the driven state to the relaxed state. A second pulse of light source 812 may occur during the relaxed state (i.e., before the drive voltage transitions back to the driven state). In other words, a pulse of the light source, or backlight enable, may be shifted to a later time for the period when the polarization switch drive voltage has a function applied during the high to low voltage transition. In some embodiments, both pulses of a light source in a frame time may be shifted later in time. When both pulses of a light source are shifted later in time, however, the shifted amount may be different for each pulse. For example, the pulse of light source that may occur during the driven-to-relaxed state transition may be shifted 2 ms later in time while the second pulse of a light source in a frame time may be shifted 1 ms later. Therefore, the pulses from light source 812 may not be spaced equally apart from one frame time to the next. In some embodiments, the backlight may be extended in terms of pulse duration. For example, one pulse of light source 812 may begin before the drive voltage transitions from the driven to the relaxed state but may complete after the voltage transition is complete. Thus, elaborating on the example, if a light pulse is typically 2 ms, then extending the light pulse may increase its duration to 3 ms. Extending or shifting the backlight may enable more of the data of LCD panel 810 to be in a steady, same state for a frame and a polarization switch 808 to be in an appropriate state when the backlight is enabled. When used in conjunction with the variable drive voltage, in which optical bounce may be minimized, shifting the backlight into the minimal optical bounce period may produce only a minimal amount of light leakage in the normal white state and a minimal drop in luminance for the normal black state. In some embodiments, the time difference between the start of the first pulse of limited duration and the start of the second pulse of limited duration in a frame may be less than the time difference from the start of the voltage reduction to the start of the voltage return to the driven level.

Light source 812 may, in various embodiments, be segmented (e.g., as further described below). In some embodiments, the backlight may be segmented into five independently addressable rows. For instance, light source 812 may be segmented into sections that may extend across horizontal bands of the display. The LEDs of light source 802 may pulse at different times, which may be optimized for timing one segment's pulse separate from other segments. Further, a segmented light source 802 may include segmented light guides that may help minimize row-to-row crosstalk.

In some embodiments, one or more components of LCD display 800 may be implemented by a computer-readable storage medium, memory, or some other component. A computer-readable storage medium may be some embodiments of an article of manufacture that stores instructions that are executable by a processor. As an example, a computer-readable storage medium can be used to store instructions read by a program and used, directly or indirectly, to fabricate hardware for control circuitry 804, described above. For example, the instructions may outline one or more data structures describing a behavioral-level or register-transfer level (RTL) description of the hardware functionality in a high-level design language (HDL) such as Verilog or VHDL. The description may be read by a synthesis tool, which may synthesize the description to produce a netlist. The netlist may include a set of gates (e.g., defined in a synthesis library), which represent the functionality of control circuitry 804. The netlist may then be placed and routed to produce a data set describing geometric shapes to be applied to masks. The masks may then be used in various semiconductor fabrication steps to produce a semiconductor circuit or circuits corresponding to control circuitry 804.

Segmented Backlight for Higher Dynamic Contrast

In some existing implementations, dynamic contrast is defined as a maximum luminance ratio achievable by a display on consecutive frames. In practice, dynamic contrast may be measured by switching a display between a color level of 0 and a color level of 255 in consecutive frames and measuring the ratio of the luminances of the bright and dark frames.

Figure 9:
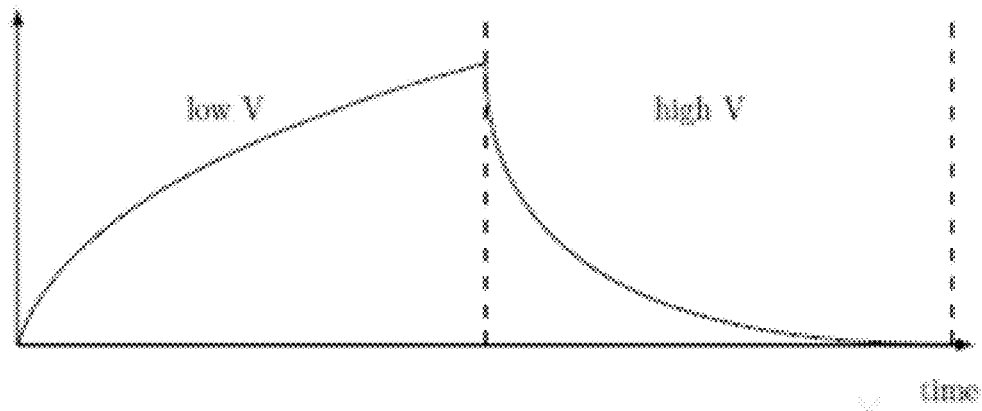
FIG. 9 illustrates an optical response of a liquid crystal cell under consecutive switching between low and high voltage states, according to existing implementations.

Higher dynamic contrast can be a critical requirement for many different applications of liquid crystal displays (LCDs). These applications include, but are not limited to, low motion blur in high frame rate monitors and/or low cross-talk in time sequential stereoscopic displays. The dynamic contrast of the display may be limited by the slow transition speed of the liquid crystal materials (e.g., as described above), especially in the transition from high to low voltage state. FIG. 9 illustrates a typical optical response of a liquid crystal cell under consecutive switching between low voltage (low V) and high voltage (high V) states, according to existing implementations. Note that due to the long transition time, a typical dynamic contrast would be expected to be in the range of 50:1 or less with a continuous backlight.

One improvement that has been implemented in many high frame rate gaming monitors is the use of pulsing backlight, e.g., the backlight may be turned on only when the liquid crystal has already approached the later stage of the transition. The pulsing backlight therefore can significantly improve the dynamic contrast if there is a good timing offset for the entire display. However, the time it takes to scan from the top row of pixels to the bottom row can be several milliseconds and no timing offset may be optimal for the entire screen. In other words, no matter the backlight is turned on, there will always be some regions of the display that has the backlight turned on too early and/or too late.

Thus, a typical monitor will compromise top and bottom areas of the monitor for better dynamic contrast at the center area. In other words, the activation of the backlight will be optimized for better dynamic contrast in the center of the monitor at the expense of sub-optimal dynamic contrast in the top and bottom areas of the monitor.

Thus, to further improve the dynamic contrast, the next stage of customization is segmented pulsing backlight. Essentially, a backlight is divided into several segments that can be controlled individually. Each segment is then chosen to have a timing offset to match with an optimal timing offset for only the rows of pixels that it covers. Theoretically, the entire display panel can have optimal timing to get higher dynamic contrast. However, light from a turning-on segment leaks to nearby segments and creates undesired luminance in those segments when liquid crystal is not in the optimal state.

Figure 10:
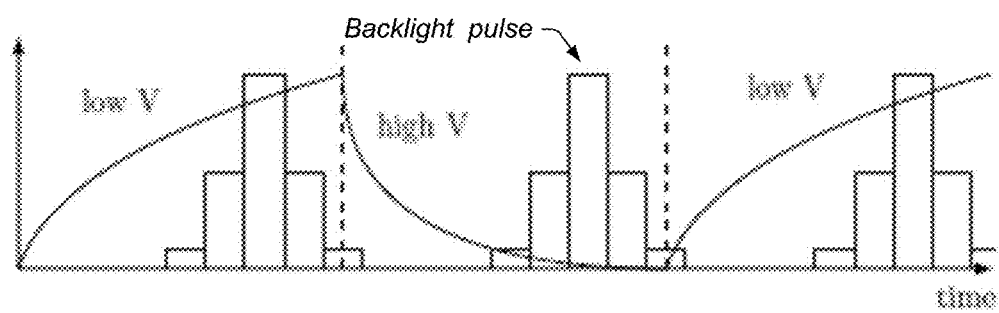
FIG. 10 illustrates a segmented pulsing backlight and voltage level of an LCD, according to existing implementations.

FIG. 10 illustrates a typical optical response for a segmented pulsing backlight and a corresponding voltage level of an LCD, according to existing implementations. As shown a main segment may be close to optimal time for liquid crystal response, but its neighbors, both from before and after, are turning on at non-optimal times. In other words, even though the intensity of the neighbor leakage is smaller than the main pulse, if it is too far away from the optimal timing and the contribution to contrast drop can be substantial. Thus, a small leakage at the second or third neighbor can be problematic: the liquid crystal is already transitioning into the next state. Therefore, to achieve higher dynamic contrast, a reduction in light leakage between different segments of the backlight is needed.

Embodiments described herein provide systems, techniques, and methods for reducing light leakage between non-adjacent segments of a segmented backlight. In some embodiments, preventing light leakage to second and further neighbors (e.g., non-adjacent segments) may be more critical to higher dynamic contrast than preventing light leakage to the first nearest neighbors (e.g., adjacent segments). For example, FIG. 11 illustrates an example of a segmented backlight, according to some embodiments. As shown each segment may have multiple cuts (e.g., notches of any shape, depth, and/or length). For example, a segmented backlight system 1100 (which may include features as described above in reference to FIG. 8), includes 3 pairs of LEDs 1114, each pair of LEDs 1114 illuminating a corresponding panel 1112, for each segment 1110a-e, and each pair of side-lit-LEDs may have an associated cut (or notch) 1120 that may be configured to reduce light transmittance. In some embodiments, the associated cut may be perpendicular to the associated LEDs. In some embodiments, a portion of the cuts may be perpendicular (or substantially perpendicular) to the associated LEDs. In some embodiments, the cuts (or a portion (or subset) thereof) may be of variable length, depth, and/or width. In other words, the dimensions of the multiple cuts may vary in any of the three dimensions (length, width, depth). Further, in some embodiments, the cuts (or a portion (or subset) thereof) may be non-linear in a direction perpendicular to the one or more sets of LEDs. In some embodiments, the cuts/notches, or a subset thereof, may be configured to be reflective (e.g., reflect substantially all light), some degree of opaque (e.g., absorb a portion of light, such as 10%, 20%, 30%, 40%, and so forth up to 99%) or blackened (e.g., darkened to absorb substantially all light).

For example, FIGS. 12A-C, 13A-C, 14A-C, and 15A-C illustrate various example embodiments of a cut/notch 1120.

Note that 12A-C, 13A-C, 14A-C, and 15A-C are exemplary only, and other configurations and/or shapes of cuts 1120 are envisioned.

FIGS. 12A-C illustrate one example of a cut 1120, according to some embodiments. As shown, the exemplary cut 1120 may have a variable depth and/or width (e.g., as illustrated by the triangular notch/cut). As illustrated, the width at the surface of the cut may be constant and decrease along the depth of the cut/notch 1120. In addition, the maximum depth of the cut/notch 1120 may be constant. Further, the shape of the cut/notch 1120 (shown as a triangle, however, other geometric shapes such as any quadrilateral and/or non continuous shapes, e.g., stair steps, are also envisioned) may be constant.

As another example, FIGS. 13A-C illustrate an example cut 1120 in which the exemplary cut 1120 has a variable maximum depth as well as a variable depth and/or width. As illustrated, the width at the surface of the cut may be constant and decrease along the depth of the cut/notch 1120. In addition, the maximum depth of the cut/notch 1120 may decrease from a first side of the cut/notch 1120 to a second side of the cut/notch 1120. Further, the shape of the cut/notch 1120 (shown as a triangle, however, other geometric shapes such as any quadrilateral and/or non continuous shapes, e.g., stair steps, are also envisioned) may be constant.

Figure 14B:
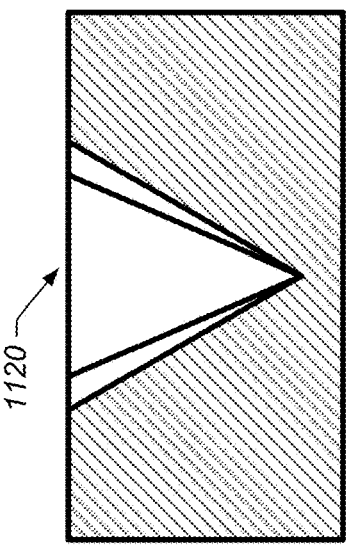
FIGS. 14A-C illustrate a further example of a notch in a segmented backlight, according to some embodiments.
Figure 14C:
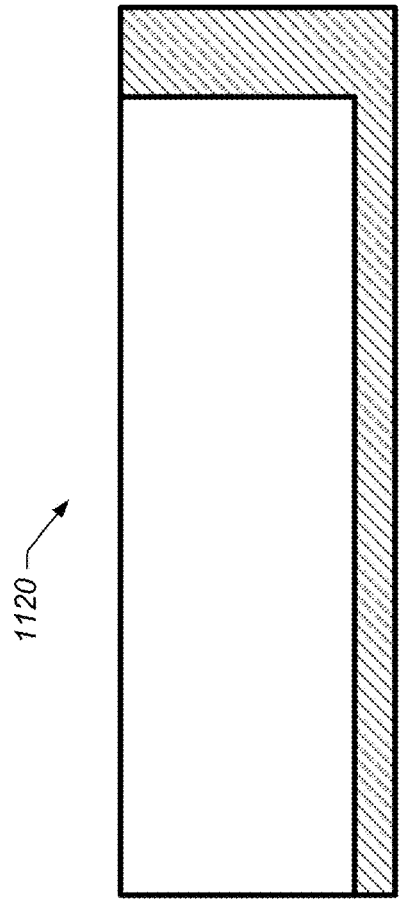
Figure 14A:
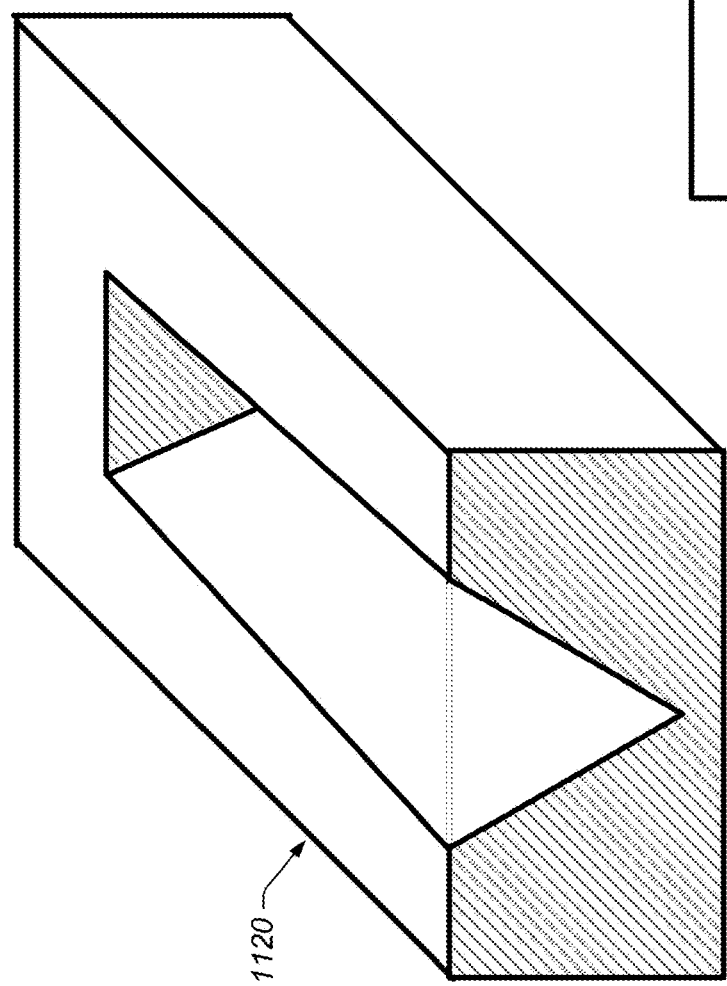

As a further example, FIGS. 14A-C illustrate an example cut 1120 in with the exemplary cut 1120 has a variable surface width in addition to a variable depth and/or width. As illustrated, the width at the surface of the cut may decrease from a first side of the cut/notch 1120 to a second side of the cut/notch 1120. Further, the width may decrease along the depth of the cut/notch 1120. In addition, the maximum depth of the cut/notch 1120 may be constant. Further, the shape of the cut/notch 1120 (shown as a triangle, however, other geometric shapes such as any quadrilateral and/or non continuous shapes, e.g., stair steps, are also envisioned) may be constant.

As yet a further example, FIGS. 15A-C illustrate an example cut 1120 in which the exemplary cut 1120 has a variable surface width in addition to a variable absolute depth as well as a variable depth and/or width. As illustrated, the width at the surface of the cut may decrease from a first side of the cut/notch 1120 to a second side of the cut/notch 1120. Further, the width may decrease along the depth of the cut/notch 1120. In addition, the maximum depth of the cut/notch 1120 may decrease from a first side of the cut/notch 1120 to a second side of the cut/notch 1120. Further, the shape of the cut/notch 1120 (shown as a triangle, however, other geometric shapes such as any quadrilateral and/or non continuous shapes, e.g., stair steps, are also envisioned) may be constant.

Note that in some embodiments, LEDs within the same segment may still have the same timing control with respect to one another, but the cut/notch between the LEDs may create a barrier within the segment. In other words, each segment may be configured as a light barrier to prevent light leakage to second and further neighbors. Unlike existing implementations, in which focus has been on making more efficient barriers between segments, embodiments described herein provided for more barriers within each segment. These additional barriers may not aid in preventing leakage to nearest neighbors, but may significantly reduce leakage to second and further neighbors. In some embodiments, the cuts (or notches) may be reflective (e.g., reflect all light), some degree of opaque (e.g., absorb a portion of light, such as 10%, 20%, 30%, 40%, and so forth up to 99%) or blackened (e.g., darkened to absorb substantially all light) to further reduce light leakage to non-adjacent neighbors.

For example, suppose a segmented backlight system, such as system 1100 described above, includes 3 pairs of LEDs for each segment, and each cut (or notch) reduces light transmittance by 50%. The relative luminance in segments 1110d and 1110e if all LEDs in segment 1110c are on (illuminated) can be estimated by considering contribution from each individual LED pair 1114 and adding them up, e.g., as shown in the table 1 below.

TABLE 1

Luminance Contributions

| | Segment 1110c | | | Segment 1110d | | | Segment 1110e | | |
|---|---|---|---|---|---|---|---|---|---|
| Turn on LED 1114 (c-1) | 1 | ½ | ¼ | ⅛ | 1/16 | 1/32 | 1/64 | 1/128 | 1/256 |
| Turn on LED 1114 (c-2) | ½ | 1 | ½ | ¼ | ⅛ | 1/16 | 1/32 | 1/64 | 1/128 |
| Turn on LED 1114 (c-3) | ¼ | ½ | 1 | ½ | ¼ | ⅛ | 1/16 | 1/32 | 1/64 |
| Turn on all 1114c LEDS | 1½ | | | 49/32 | | | 49/256 | | |

Thus, the drop-off rate for nearest (adjacent) neighbor may be the ratio of luminance between segments 1110c and 1110d as shown in equation (1):

$$r_1 = \frac{L_{1110c}}{L_{1110d}} = \frac{\frac{11}{2}}{\frac{49}{32}} = \frac{176}{49} \approx 3.6:1 \qquad (1)$$

Similarly, the drop-off rate for the next (non-adjacent) neighbor may be the ratio of luminance between segments 1110c and 1110e as shown in equation (2):

$$r_2 = \frac{L_{1110c}}{L_{1110d}} = \frac{\frac{11}{2}}{\frac{49}{256}} = \frac{1408}{49} \approx 29:1 \qquad (2)$$

Thus, a significant reduction of light leakage to non-adjacent neighbors may be achieved.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A segmented backlight, comprising:
    one or more segments; and
    one or more sets of light emitting diodes (LEDs) configured to illuminate the segmented backlight, wherein each set of LEDs illuminates a corresponding segment of the one or more segments;
    wherein each segment of the one or more segments comprise:
        one or more notches, wherein each notch of the one or more notches is configured as a light barrier, wherein the light barrier reduces light leakage to non-adjacent segments.

2. The segmented backlight of claim 1,
    wherein at least one dimension of at least a portion of the one or more notches varies along the at least one dimension.

3. The segmented backlight of claim 1,
    wherein at least two dimensions of at least a portion of the one or more notches independently vary along each of the at least two dimensions.

4. The segmented backlight of claim 1,
    wherein at least a portion of the one or more notches is arranged to be perpendicular to the one or more sets of LEDs.

5. The segmented backlight of claim 1,
    wherein at least a portion of the one or more notches are three-dimensional, having a width that varies along the depth and length of the notch and a depth that varies along the width and length of the notch.

6. The segmented backlight of claim 1,
    wherein at least a portion of the one or more notches is configured to be reflective.

7. The segmented backlight of claim 1,
    wherein at least a portion of the one or more notches is configured to be opaque.

8. The segmented backlight of claim 1,
    wherein at least a portion of the one or more notches is configured to be blackened.

9. The segmented backlight of claim 1,
    wherein the segmented backlight is comprised in a liquid crystal display (LCD).

10. The segmented backlight of claim 9,
    wherein the LCD is comprised in a wireless station.

11. The segmented backlight of claim 9,
    wherein the segmented backlight is comprised in an LCD comprised in a three-dimensional stereoscopic display system.

12. The segmented backlight of claim 11,
    wherein the three-dimensional stereoscopic display system is a wireless station.

13. A liquid crystal display (LCD) system, comprising:
    an LCD panel;
    a light source configured to illuminate the LCD panel, wherein the light source comprises:
        one or more segments, wherein each segment of the one or more segments comprise one or more notches, wherein each notch of the one or more notches is configured as a light barrier, wherein the light barrier reduces light leakage to non-adjacent segments; and
        one or more sets of light emitting diodes (LEDs), wherein each set of LEDs illuminates a corresponding segment of the one or more segments; and
    control circuitry in communication with the light source and the LCD panel, wherein the control circuitry is configured to provide a voltage signal to the one or more sets of LEDs to illuminate the one or more segments of the light source.

14. The LCD system of claim 13,
    wherein at least one dimension of at least a portion of the one or more notches varies along the at least one dimension.

15. The LCD system of claim 13,
    wherein at least two dimensions of at least a portion of the one or more notches independently vary along each of the at least two dimensions.

16. The LCD system of claim 13,
    wherein at least a portion of the one or more notches is arranged to be perpendicular to the one or more sets of LEDs.

17. The LCD system of claim 13, wherein at least a portion of the one or more notches is configured to be reflective.

18. The LCD system of claim 13, wherein at least a portion the one or more notches is configured to be opaque.

19. The LCD system of claim 13, wherein at least a portion of the one or more notches is configured to be blackened.

20. A wireless station, comprising:

at least one antenna;

at least one radio, wherein the at least one radio is configured to perform wireless communication via the at least one antenna using at least one radio access technology (RAT);

a liquid crystal display system, comprising an LCD panel and a light source, wherein the light source is configured to illuminate the LCD panel, wherein the light source comprises a plurality of segments, wherein at least one segment of the plurality of segments comprises at least one notch, wherein the at least one notch is configured to reduce light leakage to non-adjacent segments of the plurality of segments, wherein the at least one segment is illuminated via a set of light emitting diodes (LEDs); and one or more processors coupled to the at least one radio and the LCD display system, wherein the one or more processors are configured to cause the wireless station to provide a voltage signal to the set of LEDs to illuminate the at least one segment of the light source.

* * * * *